US012371942B2

(12) United States Patent
Colson

(10) Patent No.: US 12,371,942 B2
(45) Date of Patent: Jul. 29, 2025

(54) ROLL-UP COVERINGS FOR ARCHITECTURAL OPENINGS AND RELATED METHODS, SYSTEMS AND DEVICES

(71) Applicant: Hunter Douglas, Inc., New York, NY (US)

(72) Inventor: Wendell B. Colson, Weston, MA (US)

(73) Assignee: Hunter Douglas Inc., New York, NY (US)

( * ) Notice: Subject to any disclaimer, the term of this patent is extended or adjusted under 35 U.S.C. 154(b) by 836 days.

(21) Appl. No.: 16/671,388

(22) Filed: Nov. 1, 2019

(65) Prior Publication Data

US 2020/0131848 A1 Apr. 30, 2020

Related U.S. Application Data

(63) Continuation of application No. 15/174,508, filed on Jun. 6, 2016, now Pat. No. 10,465,442, which is a
(Continued)

(51) Int. Cl.
*E06B 9/34* (2006.01)
*E06B 9/303* (2006.01)
(Continued)

(52) U.S. Cl.
CPC ................ *E06B 9/34* (2013.01); *E06B 9/303* (2013.01); *E06B 9/382* (2013.01); *E06B 9/384* (2013.01); *E06B 9/386* (2013.01); *E06B 9/44* (2013.01)

(58) Field of Classification Search
CPC . E06B 9/34; E06B 9/382; E06B 9/384; E06B 9/386; E06B 9/303; E06B 9/44
See application file for complete search history.

(56) References Cited

U.S. PATENT DOCUMENTS

| | | | |
|---|---|---|---|
| 1,789,655 | A | 1/1931 | Iwata |
| 2,012,887 | A | 8/1935 | Major |

(Continued)

FOREIGN PATENT DOCUMENTS

| | | |
|---|---|---|
| AU | 2000053079 | 5/2000 |
| CN | 1263413 C | 7/2006 |

(Continued)

OTHER PUBLICATIONS

Athena Shade, "Custom Window Shades, Roler Shades, Cloth Blinds, Remote Blinds", retrieved from Internet URL: http://www.stockblinds.com/products/window-shades.html, 2 pgs, Jan. 21, 2015.

(Continued)

*Primary Examiner* — Daniel P Cahn
*Assistant Examiner* — Jeremy C Ramsey
(74) *Attorney, Agent, or Firm* — Dority & Manning, P.A.

(57) ABSTRACT

Embodiments of a roll-up covering include a first elongate tape, a second elongate tape, a third elongate tape, and a plurality of slats spaced apart along a length of and supported by each of the first and second elongate tapes. The plurality of flexible slats are configurable between an open position and a closed position wherein each of the flexible slats changes shape as it is configurable between the open position and the closed position, where in the open position a slat width of each flexible slat has a curved shape with a middle portion of each flexible slat extending more horizontal than the inner and or outer longitudinal edges of each flexible slat.

48 Claims, 20 Drawing Sheets

Related U.S. Application Data continuation of application No. 14/210,257, filed on Mar. 13, 2014, now Pat. No. 9,359,813.

(60) Provisional application No. 61/801,058, filed on Mar. 15, 2013.

(51) Int. Cl.

| | |
|---|---|
| ***E06B 9/382*** | (2006.01) |
| ***E06B 9/384*** | (2006.01) |
| ***E06B 9/386*** | (2006.01) |
| ***E06B 9/44*** | (2006.01) |

(56) References Cited

U.S. PATENT DOCUMENTS

| | | | | | |
|---|---|---|---|---|---|
| 2,056,823 | A | | 10/1936 | Brown | |
| 2,061,548 | A | | 11/1936 | Cameron | |
| 2,140,049 | A | | 12/1938 | Grauel | |
| 2,209,234 | A | | 7/1940 | Nardulli | |
| 2,267,869 | A | | 12/1941 | Loehr | |
| 2,723,715 | A | | 11/1955 | Kauffmann et al. | |
| 2,812,021 | A | | 11/1957 | Bechtler | |
| 2,840,156 | A | | 6/1958 | Griesser | |
| 2,987,120 | A | | 6/1961 | Griesser | |
| 3,324,929 | A | | 6/1967 | Griesser | |
| 3,384,519 | A | | 5/1968 | Froget | |
| 3,407,863 | A | | 10/1968 | Griesser | |
| 3,429,355 | A | | 2/1969 | Griesser | |
| 5,313,999 | A | | 5/1994 | Colson et al. | |
| 5,320,154 | A | | 6/1994 | Colson et al. | |
| 5,392,832 | A | * | 2/1995 | Colson | E06B 9/262 160/176.1 V |
| 5,394,922 | A | * | 3/1995 | Colson | B29C 66/8322 160/DIG. 7 |
| 5,456,304 | A | * | 10/1995 | Colson | E06B 9/88 160/133 |
| 5,476,130 | A | | 12/1995 | Cheng | |
| 5,485,874 | A | | 1/1996 | Whitmore | |
| 5,718,799 | A | | 2/1998 | Colson et al. | |
| 6,001,199 | A | | 12/1999 | Colson et al. | |
| 6,105,657 | A | | 8/2000 | Zorbas | |
| 6,112,797 | A | | 9/2000 | Colson et al. | |
| 6,237,667 | B1 | | 5/2001 | Fraczek et al. | |
| D456,196 | S | | 4/2002 | Colson et al. | |
| 6,688,369 | B2 | | 2/2004 | Colson et al. | |
| 6,688,370 | B1 | | 2/2004 | Nien | |
| 7,059,378 | B2 | | 6/2006 | Colson et al. | |
| 7,624,784 | B2 | | 12/2009 | Anthony et al. | |
| 8,950,462 | B2 | | 2/2015 | Cha | |
| 9,458,663 | B2 | | 10/2016 | Colson | |
| 9,512,672 | B2 | | 12/2016 | Colson | |
| 9,714,539 | B2 | | 7/2017 | Bohlen | |
| 2004/0103994 | A1 | | 6/2004 | Nien | |
| 2007/0017645 | A1 | | 1/2007 | Pon et al. | |
| 2010/0018657 | A1 | | 1/2010 | Hoffmann et al. | |
| 2011/0067821 | A1 | | 3/2011 | Byeon et al. | |
| 2011/0120661 | A1 | * | 5/2011 | Kim | E06B 9/386 139/383 R |
| 2011/0126959 | A1 | * | 6/2011 | Holt | E06B 9/34 156/65 |

FOREIGN PATENT DOCUMENTS

| | | | |
|---|---|---|---|
| CN | 101384790 | A | 3/2009 |
| CN | 20121358798 | | 4/2016 |
| EP | 0189091 | | 7/1986 |
| EP | 0549216 | B1 | 3/1997 |
| EP | 1462603 | | 9/2004 |
| EP | 1479867 | | 11/2004 |
| EP | 2216433 | A2 | 8/2010 |
| EP | 2325357 | | 5/2011 |
| EP | 2592213 | | 5/2013 |
| EP | 2716856 | | 4/2014 |
| JP | H-0673970 | A | 3/1994 |
| JP | H-06173549 | A | 6/1994 |
| JP | H7-023194 | U | 4/1995 |
| JP | 2009-203781 | A | 9/2009 |
| KR | 100988591 | B1 | 10/2010 |
| WO | 2001/002688 | A1 | 1/2001 |

OTHER PUBLICATIONS

Dakota Blinds and Shades—Blinds Blog 2, "Your Hometown Covering Experts!" 22 pgs., retrieved from Internet URL: http://ndsblinds.com/blinds_blog_2, Nov. 25, 2014.

Sunmate, Light Filtering Soft Collection, VR2 Series, 4pgs, date unknown.

International Search Report for related International Application No. PCT/US2014/026756, mailed Jul. 30, 2014.

Written Opinion for related International Application No. PCT/US2014/026756, mailed Jul. 30, 2014.

Search Report from related Chinese Patent Application No. 201700545083 dated Mar. 27, 2018, 2 pages.

Office Action issued Feb. 27, 2018 in related Japanese Patent Application No. 2016-502233.

Office Action dated Sep. 10, 2018 in related Chilean Patent Application No. 201700608, 9 pages.

Search Report and Written Opinion dated Oct. 29, 2019 received from the Intellectual Property Office of Singapore in related Application No. 10201608256W.

* cited by examiner

ROLL-UP COVERINGS FOR ARCHITECTURAL OPENINGS AND RELATED METHODS, SYSTEMS AND DEVICES

CROSS-REFERENCE TO RELATED APPLICATIONS

This patent application claims the benefit of priority to U.S. Provisional Patent Application Ser. No. 61/801,058, filed Mar. 15, 2013. The aforementioned patent application is incorporated by reference herein in its entirety for any purpose whatsoever.

COPYRIGHT NOTICE

A portion of the disclosure of this patent document contains material that is subject to copyright protection, particularly the Figures appended hereto. The copyright owner has no objection to the reproduction by anyone of the patent document or patent disclosure as it appears in the Patent and Trademark Office, patent file or records, but otherwise reserves all copyrights whatsoever.

BACKGROUND

Field of the Disclosure

The present disclosure relates primarily to coverings for architectural openings. Particularly, the present disclosure is directed to embodiments of a roll-up window covering and related methods and systems.

Description of Related Art

Retractable coverings for architectural openings have assumed numerous forms over a long period of time. Originally, coverings for architectural openings such as windows, doors, archways or the like consisted principally of fabric draped across the architectural openings. Such early forms of coverings evolved into retractable roller shades, curtains, draperies, and the like wherein the covering could be extended across the architectural opening or retracted to a top or side of the opening.

An early but still popular form of covering for architectural openings is the Venetian blind wherein a plurality of vertically extending cord ladders support parallel horizontally extending slats in a manner such that the slats can be pivoted about their longitudinal axes between open and closed positions and the entire blind can be moved between an extended position wherein it extends across the architectural opening and a retracted position where the slats are accumulated in a vertical stack adjacent to the top of the architectural opening.

Vertical blinds are also available which are very similar to Venetian blinds except the slats or vanes extend vertically and are suspended from their upper ends for pivotal movement about their longitudinal vertical axes. The entire blind can be extended across the opening or retracted adjacent to one or more sides of the opening in a horizontal stack.

However, the current state of the art of Venetian blinds and similar products continue to suffer from a variety of deficiencies. Embodiments of the present disclosure provide solutions for these as well as other problems.

SUMMARY OF THE DISCLOSURE

The purpose and advantages of the present disclosure will be set forth in, and be apparent from, the description that follows, as well as will be learned by practice of embodiments made in accordance with the disclosure. Additional advantages of the invention will be realized and attained by the methods and systems particularly pointed out in the written description and claims hereof, as well as from the appended drawings.

To achieve these and other advantages and in accordance with the purposes of the disclosure, as embodied and broadly described, in accordance with some implementations, the disclosure provides a roll-up covering for an architectural opening. The roll-up covering includes a roller having a first end and a second end and defining a width between the first end and the second end. The roller preferably defines a central rotational axis. The roll-up covering further includes a first outer elongate tape that in turn has a first end, a second end, and defines a length between the first end and the second end. The first outer elongate tape further defines a lateral width, a thickness and a first central longitudinal axis between the first end and second end of the first outer elongate tape, such as along a geometric center of the first outer elongate tape.

The first end of the first outer elongate tape can be attached to the roller such that the first central longitudinal axis of the first outer elongate tape is oriented generally orthogonally with respect to the central rotational axis of the roller.

The roll-up covering further includes a first inner elongate tape disposed proximate to the outer elongate tape. The first inner elongate tape has a first end, a second end, and defines a length between the first end and the second end. The first inner elongate tape further defines a lateral width, a thickness and a second central longitudinal axis between the first end and second end of the first inner elongate tape. The first inner elongate tape further defines a plurality of collapsible hinge segments disposed along the length of the first inner elongate tape. The collapsible hinge segments are configured to collapse in order to decrease the effective length of the first inner elongate tape when the first inner elongate tape is rolled up around the roller. The collapsible hinge segments are further configured to expand in order to increase the effective length of the first inner elongate tape when the roll-up covering is unrolled from the roller. The first end of the first inner elongate tape can be attached to the roller such that the second central longitudinal axis can be oriented generally orthogonally with respect to the central rotational axis.

The roll-up covering further includes a plurality of slats disposed between and coupled to the first outer elongate tape and the first inner elongate tape. The slats can be oriented transversely with respect to the first and central longitudinal axes. The plurality of slats, first outer elongate tape and first inner elongate tape define a subassembly that is configured to be rolled up around the roller, wherein the first inner elongate tape is located radially inwardly with respect to the first outer elongate tape when the sub assembly is rolled up around the roller.

In accordance with a further aspect, the sub assembly can be configured to reside in a collapsed configuration wherein the slats are closed when the sub assembly is initially unrolled from the roller. The plurality of slats are preferably oriented parallel to the first inner elongate tape and the outer elongate tape when the sub assembly is in the collapsed configuration, wherein the slats are closed or substantially closed when the sub assembly is initially unrolled from the roller. The sub assembly can be deployed from the collapsed configuration into an expanded configuration wherein the slats are opened by further rotation the roller.

In many implementations, the first outer elongate tape and the first inner elongate tape can be substantially parallel along their length when the sub assembly is in the collapsed configuration and the expanded configuration. Moreover, the first outer elongate tape and the first inner elongate tape can be substantially parallel along their lengths while the sub assembly is deployed from the collapsed configuration into the expanded configuration. In an alternative embodiment, the tapes are not always parallel during deployment.

In accordance with a further aspect, a plurality of the slats, and if desired, all of the slats can have an elongate, flexible generally planar body that has an inner edge attached to the first inner elongate tape, an outer edge attached to the first outer elongate tape, and side edges joining the inner edge and outer edge. In some implementations, at least one of an inner edge region along the inner edge of at least one slat and an outer edge region along the outer edge of the at least one slat can be stiffer than a region between the inner edge and outer edge of the at least one slat. Such flexibility can be useful in providing a versatile geometry for the roll-up covering. In some implementations, at least one of the inner edge region and the outer edge region can include at least one elongate stiffener for increasing the stiffness of the at least one slat, the at least one elongate stiffener defining a length and a central lateral axis along its length. Thus, the inner edge, outer edge, or both edges can be provided with one or more such stiffeners.

In accordance with further aspects, the at least one elongate stiffener can be substantially planar (e.g., flat, crowned, creased, and the like) and lay in substantially the same plane as one of the first central longitudinal axis of the first outer elongate tape and the second central longitudinal axis of the first inner elongate tape. The at least one stiffener can further define a width perpendicular to the length, and a thickness perpendicular to the width and the length. The at least one elongate stiffener can have a curved cross section in a plane perpendicular to the central lateral axis (e.g. be"crowned") such that a first curved planar face of the at least one elongate stiffener can be convex and a second, opposite curved planar face of the at least one elongate stiffener can be concave. The concave face of the at least one stiffener preferably faces the roller when the sub assembly is rolled up around the roller. The concave face of the at least one stiffener can have a radius of curvature that substantially matches a radius of curvature of the roller. The at least one stiffener has a thickness that is preferably substantially smaller than its width.

In accordance with a further aspect, the at least one slat can includes a first stiffener proximate to the inner edge region of the at least one slat and a second stiffener proximate to an outer edge region of the at least one slat, each of the first and second stiffeners having a concave face. The concave faces of the first stiffener and the second stiffener can both face in the same direction. Moreover, the concave faces of the first stiffener and the second stiffener can have a radius of curvature that substantially matches a radius of curvature of the roller to facilitate rolling up of the sub assembly. In accordance with a further aspect, the at least one slat can be formed from a flexible fabric material. The at least one stiffener can be formed, for example, from at least one of a rigid plastic material, a metallic material, such as aluminum, titanium, brass or steel, or the like.

In some implementations, the flexible fabric material of the at least one slat can be disposed between and attached to an outwardly facing face of the first inner tape and an inwardly-facing concave face of the first stiffener along the inner edge of the at least one slat. In another embodiment, the first stiffener can be disposed in a sleeve defined along an interior portion of the slat. The flexible fabric material of the at least one slat can be disposed between and attached to an inwardly facing face of the first outer tape and an outwardly-facing convex face of the second stiffener along the outer edge of the at least one slat, among other possible configurations. The flexible fabric material of the at least one slat can be attached to an inwardly facing face of the first outer tape along a two dimensional contact or bonding area that extends parallel to the first central longitudinal axis and transversely with respect to the first central longitudinal axis. For example, the contact or bonding area can be generally rectangularly-shaped, triangularly shaped, “X”-shaped, “L”-shaped, as desired. The flexible fabric material of the at least one slat can be attached to an inwardly facing face of the outer tape by one or more of (i) an adhesive, (ii) at least one fastener, (iii) stitching, (iv) three dimensional weaving and (v) ultrasonic welding.

In accordance with a further aspect, at least one of the slats can include at least one transverse stiffener attached to the at least one slat in a region of the slat disposed between the first outer elongate tape and first inner elongate tape. Any desired number of slats can be provided with this feature in order to help maintain uniform spacing between the tapes when the sub assembly is deployed. In one embodiment, one or more such transverse stiffeners are provided in, on or under a top slat in the sub-assembly to resist an inwardly compressive force arising from a combination of the weight of the sub assembly acting in concert with an angulation of the inner and outer tapes proximate the roller. In one embodiment, the at least one transverse stiffener can be disposed between the first stiffener and the second stiffener to provide a slat with a particularly stable shape during deployment. When the at least one transverse stiffener is disposed on an upper slat in the sub assembly, the at least one transverse stiffener is thus adapted to maintain the upper slat in a generally open condition, and causes the first outer elongate tape to be separated from the first inner elongate tape. If desired, the at least one transverse stiffener can be disposed across the slat between the first outer elongate tape and the first inner elongate tape to act as a strut to separate the tapes. Moreover the at least one transverse stiffener can be crowned for enhanced sectional modulus and column strength. Preferably, the at least one transverse stiffener is a crowned member that can buckle or otherwise collapse and roll up around the roller when the subassembly is retracted around the roller.

In accordance with one embodiment, first and second magnetic connectors can be disposed opposing one another to control the opening of the covering for the architectural opening. For example, the first magnetic connector can be disposed and movable on an outer surface of the first inner elongate tape and the second magnetic connector can be disposed and movable on an outer surface of the first outer elongate tape, wherein the first and second magnetic connectors hold the first inner elongate tape and first outer elongate tape together to maintain at least a portion of the window covering in a closed condition. In some implementations, the first and second magnetic connectors have sufficient magnetic forces attracting each other such that moving one of the first and second magnetic connectors can cause coordinated movement of the other of the first and second magnetic connectors. In accordance with an exemplary embodiment of the present disclosure, the coordinated upward movement of the first and second magnetic connectors can cause the side edges of the plurality of slats to collapse against the first inner elongate tape and first outer elongate tape, and the downward movement of the first and second magnetic connectors can cause the side edges of the plurality of slats to separate from the first inner elongate tape and first outer elongate tape. In the illustrated embodiment, the first connector can be movable along the second central longitudinal axis, and second connector can be movable along the first central longitudinal axis. In another embodiment, the pair of magnetic connectors can be removable from the first outer elongate tape and the first inner elongate tape. It will be appreciated that a variety of other connectors can be used in place of or in addition to the first and second magnetic connectors, such as clips and the like to selectively hold the inner and outer elongate tapes together. In accordance a further embodiment, each pair of opposing elongate tapes, such as the third and fourth, and fifth and sixth, elongate tapes (or only some of the pairs of tapes, as desired) can be provided with pairs of magnetic connectors as described above.

In accordance with still a further aspect, the first inner elongate tape and first outer elongate tape can be aligned to roll on top of each other when the sub-assembly is retracted around the roller. Alternatively, the first inner elongate tape and first outer elongate tape can be laterally displaced from each other along the length of the slats such that they do not roll on top of each other when the sub-assembly is retracted around the roller. In accordance with a further example, the first inner elongate tape and first outer elongate tape can have different lateral widths.

In accordance with one embodiment, the first inner elongate tape and first outer elongate tape can be attached proximate to a center of the roller between the first end and the second end. If desired, the ends of the slats of this embodiment can be freely floating by virtue of using one or more stiffeners along the length of each slat.

In accordance with another embodiment of the present disclosure, a door can be provided on the body of the roller, wherein the door has a width defined by the first and second end of the roller (or other suitable width), a radial curvature that substantially matches that of the roller, an inner end, an outer end, a thickness, and a length that is defined between the inner and outer end. It can be further provided that the radial curvature of the door forms a concave inner face and a convex outer face for the door.

In a further embodiment, the door can be attached to the roller via a hinge at the inner end, wherein the hinge can be a concavely curved inner end of the door on the concave inner face hooked into a receiving cavity of the roller for the width of the roller.

In accordance with another embodiment, the door can be operable to be opened by detaching or separating from the roller on the outer end and attaching to the roller at the inner end via the hinge across the width of the door. The door can be further operable to be closed by collapsing and rolling the outer end of the door toward and around the roller. In a further embodiment of the present disclosure, a raised ridge can be integrally provided on the concave inner face of the door along the width of the door whereby the ridge and the outer end of the door form a track across the width of the door and the ridge can have a concave raised edge along the width of the door. In accordance with one embodiment, the track can accommodate at least one elongate stiffener attached to a flexible slat of the covering. For example, the stiffener can be covered by a flexible portion of the slat such that the stiffener covered with the flexible portion of the slat can be disposed in the track across the width of the track. The slat can be attached to an inwardly facing face of the first inner elongate tape by, for example, adhesive, fastener (s), stitching, three-dimensional weaving, ultrasonic welding and the like.

In accordance with another embodiment of the present disclosure, a receiving track can be integrally provided on the body of the roller wherein the receiving track has a width defined by the first and second end of the roller, a radial curvature that substantially matches the curvature of the roller, a first end, a second end, a thickness, and a length defined between the first and second end of the receiving track. In a further embodiment, the receiving track can accommodate at least one elongate stiffener whereby the stiffener is covered by a flexible slat portion such that the stiffener covered with the slat portion can be disposed in the receiving track for the width of the receiving track and the slat portion of the at least one stiffener is attached to an inwardly facing face of the first outer elongate tape by, for example, adhesive, fastener, stitching, three-dimensional weaving, ultrasonic welding and the like.

In accordance with another embodiment, when the door on the roller is in an open position it maintains the upper slat of the roll-up covering in a generally open condition such that the first outer elongate tape can be separated from the first inner elongate tape. Such an embodiment can thus be used without a transverse stiffener, as described elsewhere herein. In accordance with another embodiment, the first inner elongate tape and first outer elongate tape can be attached proximate to a first end of the slats, and the roll up covering can further include a second outer elongate tape having a first end, a second end, and defining a length between the first end and the second end. The second outer elongate tape can further define a lateral width, a thickness and a third central longitudinal axis between the first end and second end of the second outer elongate tape. The first end of the second outer elongate tape can be attached to the roller such that the third central longitudinal axis of the second outer elongate tape can be oriented generally orthogonally with respect to the central rotational axis of the roller, and be displaced laterally along the roller from the first outer elongate tape, such as at the second end of the roller, or another location. The roll up covering can still further include a second inner elongate tape disposed proximate to the second outer elongate tape. The second inner elongate tape can have a first end, a second end, and define a length between the first end and the second end. The second inner elongate tape can further define a lateral width, a thickness and a fourth central longitudinal axis between the first end and second end of the second inner elongate tape. The second inner elongate tape can further define a plurality of collapsible hinge segments disposed along the length of the second inner elongate tape. The collapsible hinge segments are preferably configured to collapse in order to decrease the effective length of the second inner elongate tape when the second inner elongate tape is rolledup around the roller. The collapsible hinge segments are preferably further configured to expand in order to increase the effective length of the second inner elongate tape when the roll-up covering is unrolled from the roller. The first end of the second inner elongate tape can be attached to the roller such that the second central longitudinal axis can be oriented generally orthogonally with respect to the central rotational axis. In a particular embodiment, the second inner elongate tape and second outer elongate tape are attached proximate to a second end of the slats.

In accordance with still another embodiment the roll-up covering can further include a third outer elongate tape having a first end, a second end, and defining a length between the first end and the second end. The third outer elongate tape can further define a lateral width, a thickness and a fifth central longitudinal axis between the first end and second end of the third outer elongate tape. The first end of the third outer elongate tape can be attached to the roller such that the fifth central longitudinal axis of the third outer elongate tape can be oriented generally orthogonally with respect to the central rotational axis of the roller. The roll-up window covering can still further include a third inner elongate tape disposed proximate to the third outer elongate tape. The third inner elongate tape has a first end, a second end, and defines a length between the first end and the second end. The second inner elongate tape can further define a lateral width, a thickness and a sixth central longitudinal axis between the first end and second end of the third inner elongate tape. The third inner elongate tape can further define a plurality of collapsible hinge segments disposed along the length of the third inner elongate tape. The hinge segments can be configured to collapse in order to decrease the effective length of the third inner elongate tape when the third inner elongate tape is rolled up around the roller. The hinge segments can further be configured to expand in order to increase the effective length of the third inner elongate tape when the roll-up covering is unrolled from the roller. The first end of the third inner elongate tape can be attached to the roller such that the sixth central longitudinal axis can be oriented generally orthogonally with respect to the central rotational axis. If desired, the third inner elongate tape and third outer elongate tape can be attached to the roller proximate a center of the roller, between the first and second sets of tapes.

In accordance with still further aspects of the disclosure, the roll-up covering can further include a weight proximate to the second ends of the first, second, and/or third inner elongate tapes. The weight is preferably configured to maintain tension on the first inner elongate tape.

In accordance with still further aspects, each of the aforementioned plurality of collapsible hinge segments can be disposed proximate to a slat in the sub assembly. In some implementations, each hinge segment can be defined by a plurality of spaced apart transverse crease lines defined in the first inner elongate tape. In some implementations, the hinge segment(s) can fold downward onto an exterior face of the first inner elongate tape when the subassembly is rolled onto the roller. In some embodiments, a lower crease line defining the hinge segment can be disposed proximate to a transverse edge of one of the slats. If desired, the lower crease line can be disposed immediately above a region where the first inner elongate tape is attached to the transverse edge of the slat.

In some embodiments, the tapes can be made from a flexible material. If desired, the crease lines can be crush formed into the flexible material. For example, the flexible material can be selected from the group including films and textiles. If desired, the textile can be selected from the group consisting of knits, wovens and non-wovens. The flexible material used for the tapes preferably have a thickness between about 1-30 mils, 1.5-25 mils, 2-25 mils, 3-20 mils, 4-18 mils, 6-16 mils, 8-14 mils, and about 10-12 mils.

In some embodiments, the tapes and slats can be made from a woven material such as a Roe-Lon® blackout drapery liner material, manufactured by Rockland Industries, Inc. (1601 Edison Hwy Baltimore, MD 21213, (410) 522-2505). In some implementations, the stiffeners can be polymeric or aluminum crowned blind slats that are about 0.008 inches thick and 16 mm wide. In alternative embodiments, the width of the stiffeners can vary from about 3/16 of an inch to about 5/8 inch or up to about one inch. A larger stiffener width can be appropriate, particularly for slats of larger depth (e.g., 4, 4.5, 5, 5.5 or 6 inches).

In accordance with further aspects of the disclosure, subsequent slats can be separated by a substantially uniform distance along the first outer elongate tape and the first inner elongate tape. If desired, such a distance can be a standard distance (e.g., 6 omm, 72 mm), or the spacing can be customized to any desired length, as subsequent slats can be overlapped to any desired extent, such as about 5%, 10%, 15%, 20%, 25%, 30%, 35%, 40%, 45%, 50% or any increment therebetween of 1%. Thus, a custom roll-up covering may be provided wherein the spacing between adjacent slats is determined by dividing a total custom height of the subassembly by a number of desired slats. Thus, it is possible to provide a custom subassembly of custom height with a custom, uniform distance between the slats.

In accordance with a further aspect, subsequent slats can be separated by a non-uniform distance along at least one of the first outer elongate tape and the first inner elongate tape. If desired, the spacing between subsequent slats can be selected to cause the slats to open at different rates, for example, such that light will be permitted to passthrough a first portion of the roll up covering before passing through a second portion of the roll up covering.

In further accordance with the disclosure, a ladder tape is provided. Such a ladder tape can be configured to be biased to close, and to roll up onto itself. For example, such a ladder tape can include a first elongate tape having a first end, a second end, and defining a length between the first end and the second end, the first elongate tape further defining a lateral width, a thickness and a first central longitudinal axis between the first end and second end of the first outer elongate tape, the first end of the first elongate tape being configured to be attached to a roller. The ladder tape can further include a second elongate tape disposed parallel to the first elongate tape. The second elongate tape has a first end, a second end, and defines a length between the first end and the second end. The second elongate tape further defines a lateral width, a thickness and a second central longitudinal axis between the first end and second end of the second elongate tape. The second elongate tape further defines a plurality of collapsible hinge segments disposed along the length of the second elongate tape. The collapsible hinge segments can be configured to collapse in order to decrease the effective length of the second elongate tape when the second elongate tape is rolled up around a roller radially inwardly of the first elongate tape. The collapsible hinge segments can further be configured to expand in order to increase the effective length of the second elongate tape when the inner and outer tapes are unrolled from the roller.

The ladder tape can further include a plurality of connectors disposed between and coupled to the first elongate tape and the second elongate tape along the length of the tapes, the tapes and connectors cooperating to form a ladder tape suitable for receiving slats to make a blind. If desired, at least one of the connectors can include a flexible fabric body having a first end, a second end, a first planar face and a second planar face. The first planar face can be attached to an inwardly facing face of the first elongate tape at the first end, and the second planar face can be attached to an inwardly facing face of the second elongate tape at the second end. The ladder tape can be biased to fold into a planar configuration. If desired, the connectors can assume a "Z" or "S" shape when the ladder tape is deployed.

It is to be understood that both the foregoing general description and the following detailed description are exemplary and are intended to provide further explanation of the embodiments disclosed herein.

DETAILED DESCRIPTION

Reference will now be made in detail to the present preferred embodiments of the disclosure, examples of which are illustrated in the accompanying figures.

The embodiments of roll-up coverings herein can be used for covering any desired architectural opening such as windows, sliding doors. French doors and the like. Ladder tapes as presented herein can be used with any desirable slat configuration to achieve a desired aesthetic appearance for a window covering. Roll up coverings as set forth herein represent a significant improvement over existing technology. To Applicant's knowledge, no window coverings have existed before that provide all of the advantages, benefits, simplicity and aesthetic appeal of the disclosed embodiments.

Figure 1B:
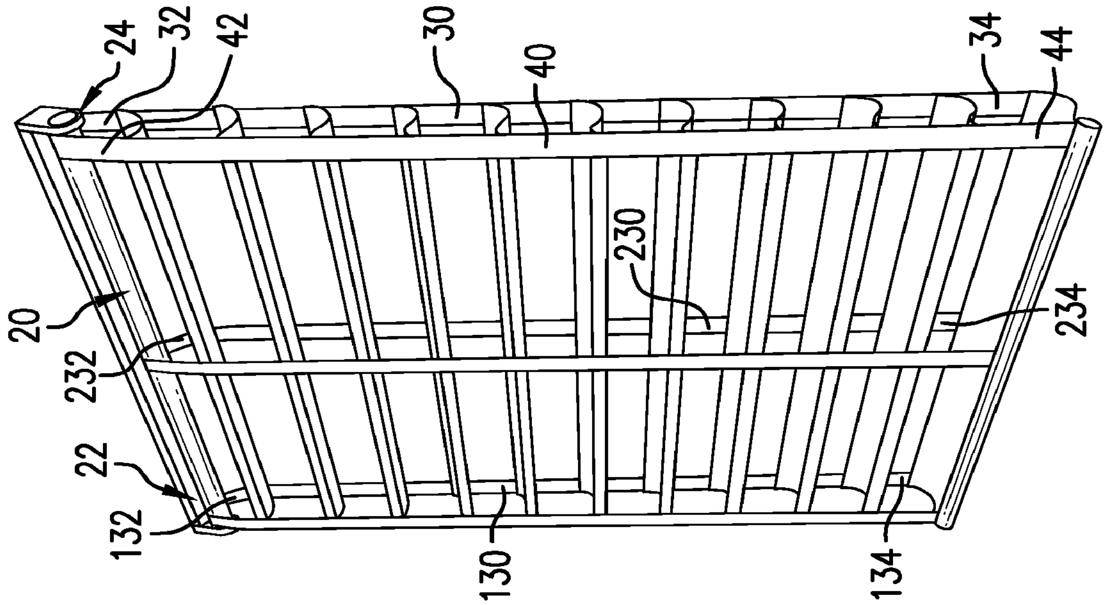
FIG. 1B depicts the roll up covering of FIG. 1A having the deployed sub assembly in an open condition illustrating the slats.
Figure 1A:
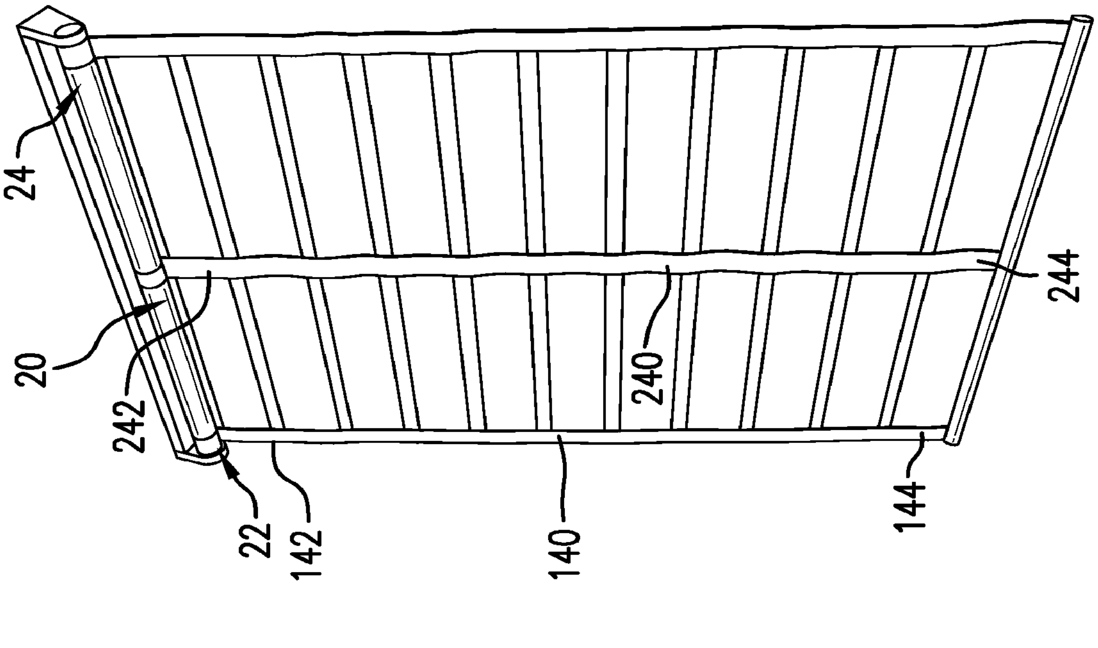
FIG. 1A depicts a first embodiment of a roll up covering made in accordance with the disclosure having a deployed sub assembly in a closed condition.
Figure 2:
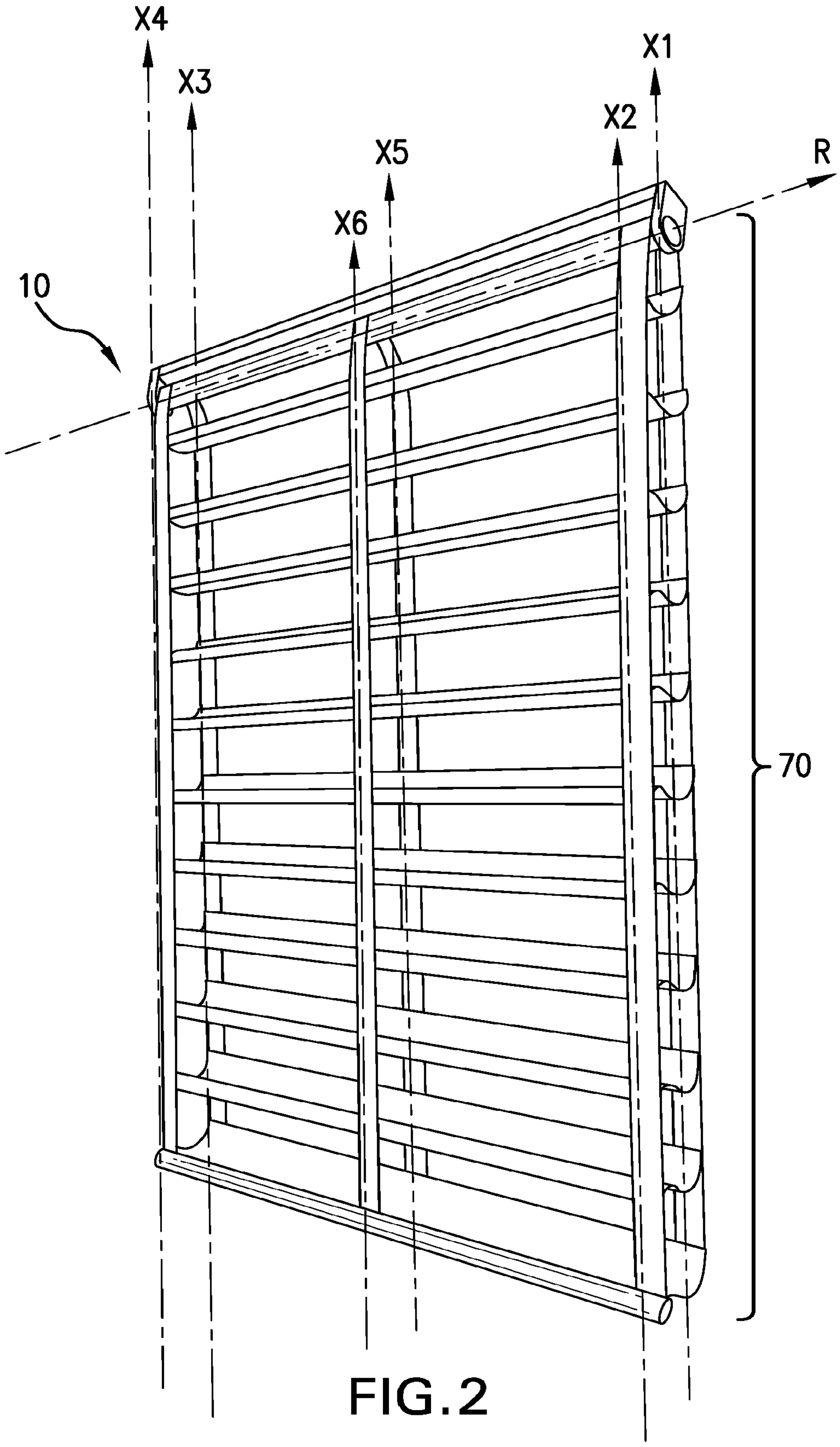
FIG. 2 depicts the embodiment of FIG. 1 illustrating a descriptive axial coordinate system.

For purpose of illustration and not limitation, a first embodiment of the device made in accordance with the present invention is illustrated in FIGS. 1A-1B and 2. a roll-up covering 10 for an architectural opening is illustrated. The roll-up covering 10 includes a roller 20 having a first end 22, a second end 24 and defining a width between the first end and the second ends. The roller preferably defines a central rotational axis "R". A pull chain 26 is provided that wraps around a portion of roller 20 in order to cause the roller to unroll the roll-up covering to unroll, open, close, and roll back up.

The roll-up covering 10 further includes a first outer elongate tape 30 that in turn has a first end 32, a second end 34, and defines a length between the first end and the second end. The first outer elongate tape 30 further defines a lateral width, a thickness and a first central longitudinal axis "X1" between the first end 32 and second end 34 of the first outer elongate tape 30, such as along a geometric center of the first outer elongate tape 30. The first end 32 of the first outer elongate tape 30 can be attached to the roller such that the first central longitudinal axis of the first outer elongate tape is oriented generally orthogonally with respect to the central rotational axis "R" of the roller 20.

The roll-up covering 10 further includes a first inner elongate tape 40 disposed proximate to the outer elongate tape 30. The first inner elongate tape 40 has a first end 42, a second end 44, and defines a length between the first end 42 and the second end 44. The first inner elongate tape 40 further defines a lateral width, a thickness and a second central longitudinal axis "X2" between the first end 42 and second end 44 of the first inner elongate tape 40. The first inner elongate tape 40 further defines a plurality of collapsible hinge segments 50 (FIG. 3) disposed along the length of the first inner elongate tape 40. As illustrated in FIGS. 8A-8D, the collapsible hinge segments 50 are configured to collapse in order to decrease the effective length of the first inner elongate tape 40 when the first inner elongate tape is rolled up around the roller. The collapsible hinge segments 50 are further configured to expand in order to increase the effective length of the first inner elongate tape 40 when the roll-up covering 10 is unrolled from the roller 20. The first end 42 of the first inner elongate tape 40 can be attached to the roller 20 such that the second central longitudinal axis X2 can be oriented generally orthogonally with respect to the central rotational axis R. These innovations permit the first outer tape 30 and the first inner tape 40 to have the same, or substantially the same geometric length when the tapes are deployed, and at the same time effectively have different lengths when rolled up, thus permitting the roll-up covering to roll up neatly and reliably.

As further illustrated in the Figures, the roll-up covering further includes a plurality of slats 60 disposed between and coupled to the first outer elongate tape 30 and the first inner elongate tape 40. The slats 60 can be oriented transversely with respect to the first and central longitudinal axes (X1, X2). The plurality of slats 60, first outer elongate tape 30 and first inner elongate tape 40 define a sub assembly 70 that is configured to be rolled up around the roller 20, wherein the first inner elongate tape 40 is located radially inwardly with respect to the first outer elongate tape 30 when the subassembly is rolled up around the roller. Locating tape 40 radially inwardly from tape 30 results in tape 40 needing to be "shorter" than tape 30. The collapsible hinge segments 50 facilitate this. Each collapsible hinge segment includes a displaceable body portion 52 that is bounded by a lower hinge 54 and an upper hinge 56. As illustrated in the figures, when the sub assembly 70 is rolled around the roller, the inner tape 40 buckles outwardly from the second central longitudinal axis X2, and forces the body portion 52 to be displaced and bent over the lower hinge 54 such that the inner tape effectively folds upon itself at each hinge point in order to effectively shorten its length, and permit the sub assembly to roll up neatly around the roller.

In accordance with a further aspect, the sub assembly 70 can be configured to reside in a collapsed configuration (FIG. 1A) wherein the slats 60 are closed when the sub assembly 70 is initially unrolled from the roller. The slats 60 are preferably oriented parallel to the first inner elongate tape 40 and the outer elongate tape 30 when the subassembly 70 is in the collapsed configuration. In this manner, the slats 60 are closed or substantially closed when the sub assembly 70 is initially unrolled from the roller 20.

The sub assembly 70 can be deployed from the collapsed configuration (FIG. 1A) into an expanded configuration (FIG. 1B) wherein the slats are opened by further rotation of the roller.

Figure 5F:
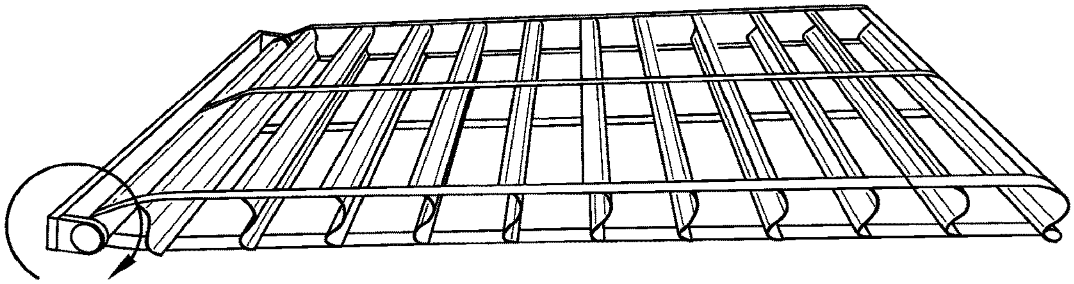
FIGS. 5A-5F depict progressive views of the roll up covering of FIG. 1 in successive stages of deployment.
Figure 5E:
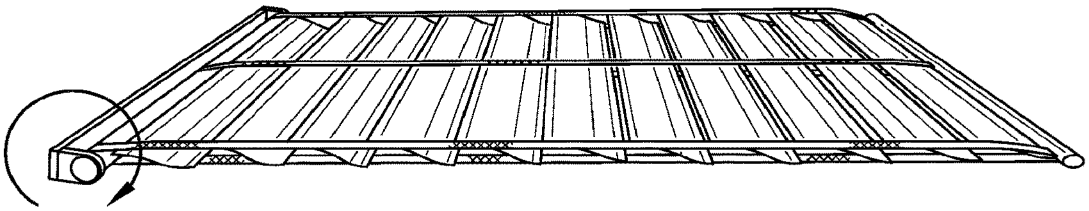
Figure 5D:
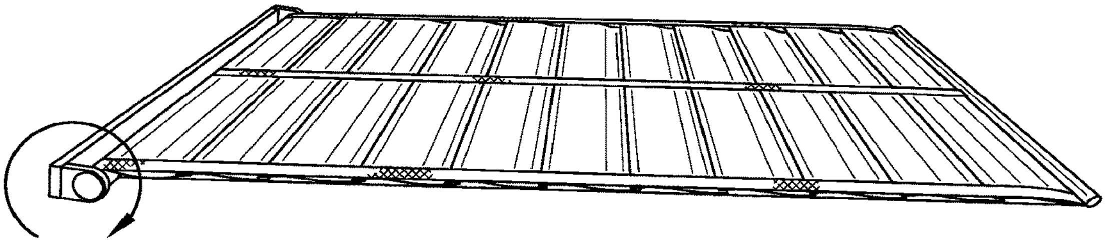
Figure 5C:
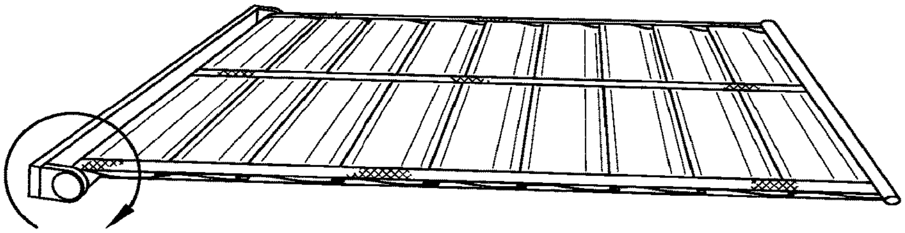
Figure 5A:
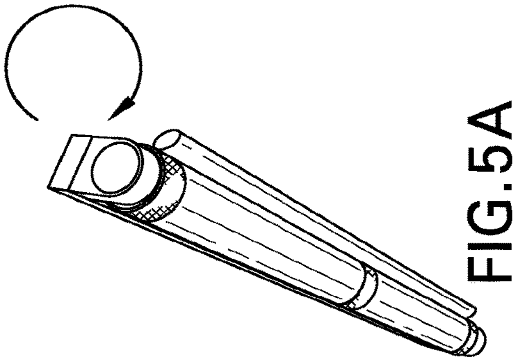
Figure 5B:
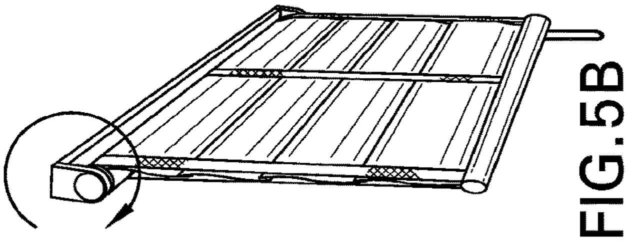

FIGS. 5(A)-5(F) depict progressive views of the roll up covering of FIG. 1 in successive stages of deployment by rotating the roller in the direction indicated. Closure and wind up of the roll-up covering is simply achieved by rotating the roller 20 in a direction opposite the arrow. As is evident, in the illustrative embodiment, the first outer elongate tape 30 and the first inner elongate tape 40 can be substantially parallel along their length when the sub assembly 70 is in the collapsed configuration (FIG. 5D) and the expanded configuration (FIG. 5F). Moreover, the first outer elongate tape 30 and the first inner elongate tape 40 can be substantially parallel along their lengths while the sub assembly is being deployed from the collapsed configuration into the expanded configuration (FIG. 5E). In an alternative embodiment, the tapes 30, 40 can be configured so as to not be parallel during deployment, such as when the spacing between adjacent slats is varied in order to cause the slats to open in a first part of the roll-up covering to open earlier than slats in a second part of the covering. For example, as discussed below, the slats 60 in a lower region of the roll-up covering 10 can be caused to open before slats 60 in an upper region of the covering 10.

Figure 4:
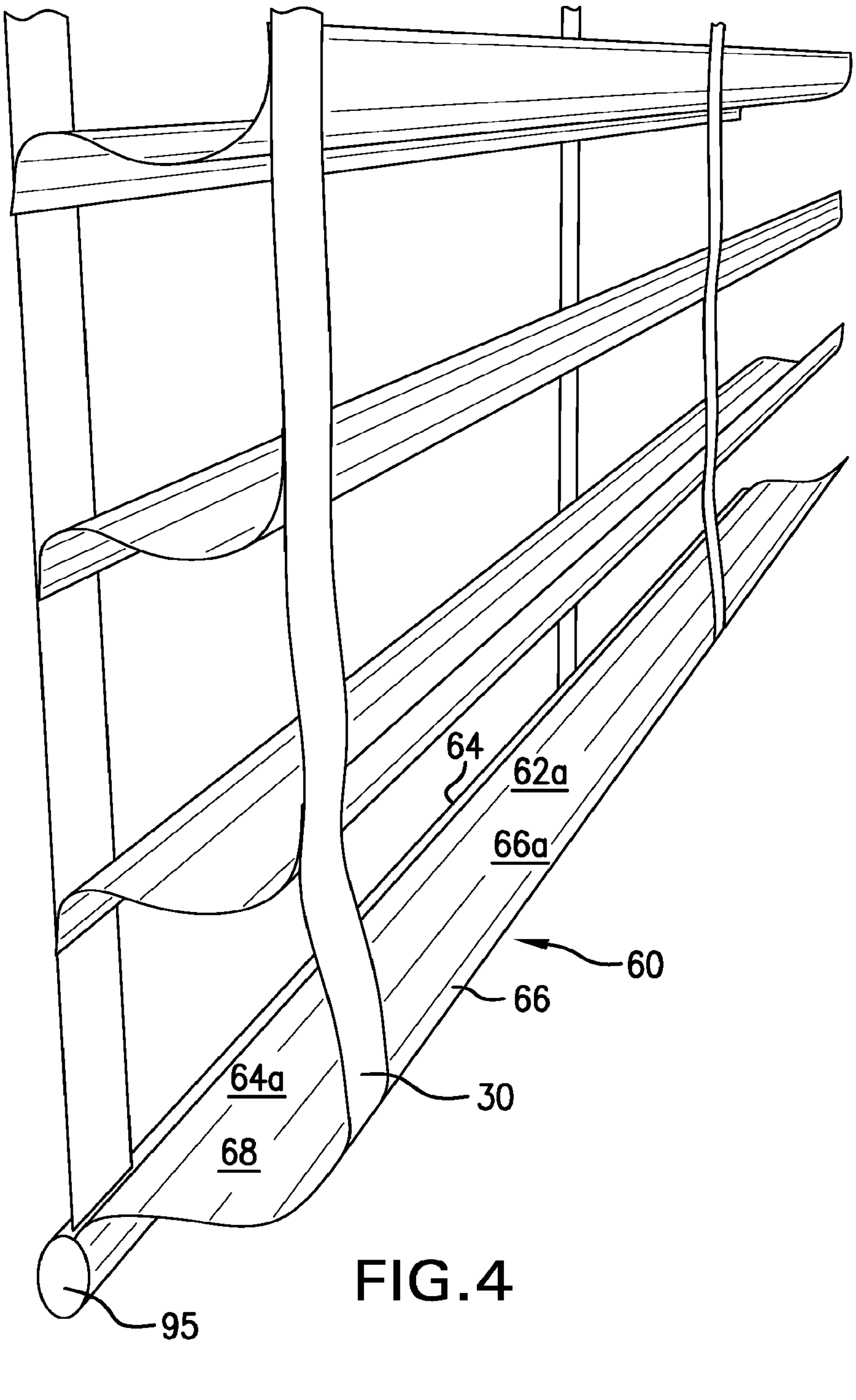
FIG. 4 depicts a close up view of a lower portion of the embodiment of FIG. 1.
Figure 6:
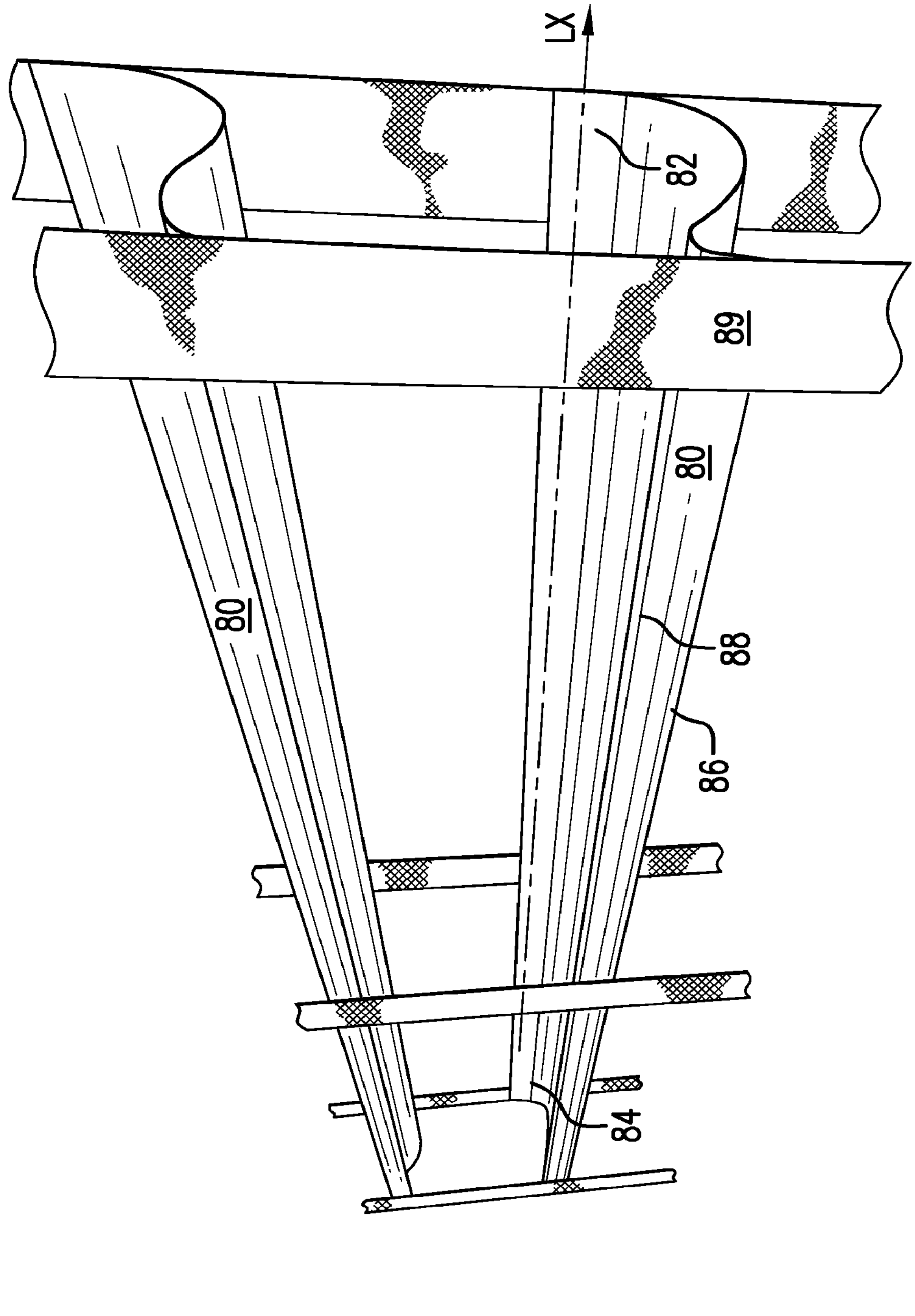
FIG. 6 depicts a close up view of a portion of the embodiment of FIG. 1 illustrating positioning and orientation of the stiffeners in the slats.
Figure 7A:
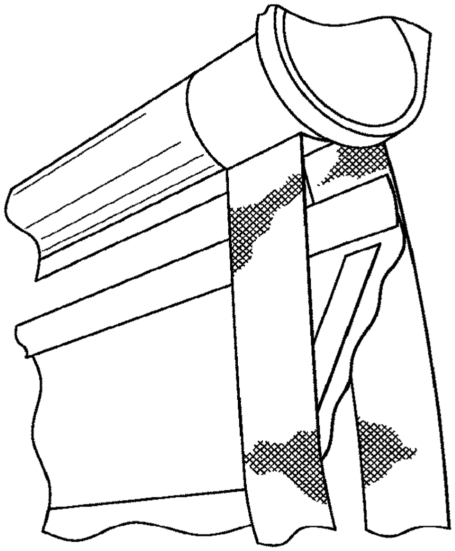
FIGS. 7A-E illustrate an upper portion of the roll-up covering of FIG. 1 detailing the manner of assembly of the tapes to the roller and the alignment of the tapes with the roller, as well as illustrating a transverse stiffener.
Figure 7B:
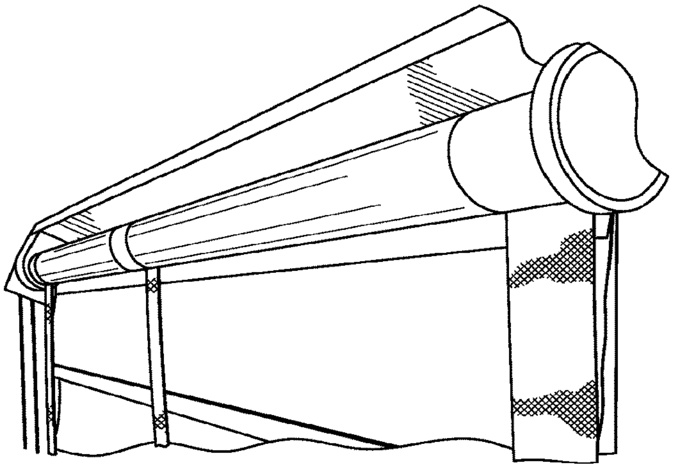
Figure 7C:
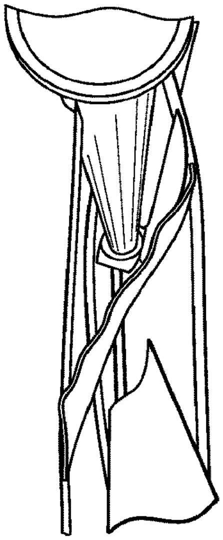
Figure 7D:
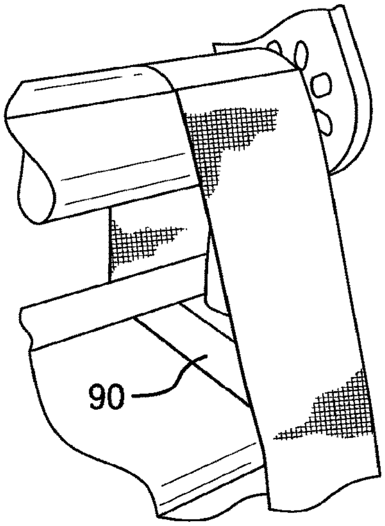
Figure 7E:
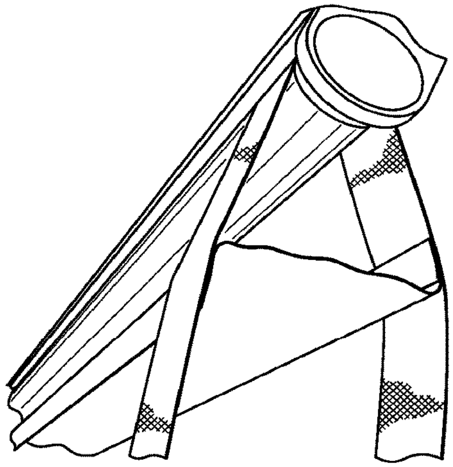
Figure 8D:
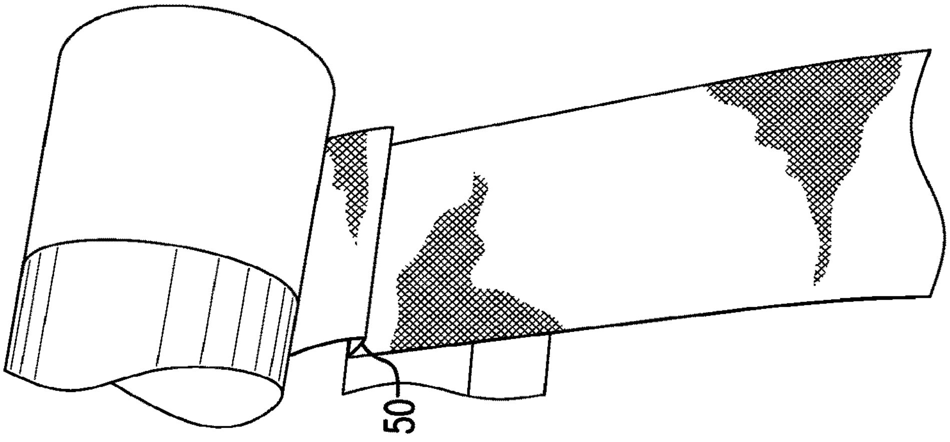
FIGS. 8A-8D depict progressive views of the roll-up covering of FIG. 1 in a process of rolling up, illustrating the manner in which the hinge on the inner tape collapses upon itself.
Figure 8C:
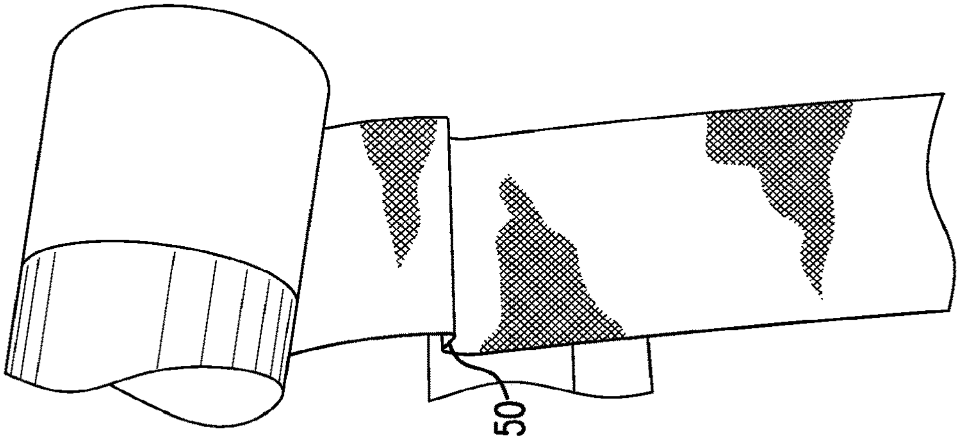
Figure 8B:
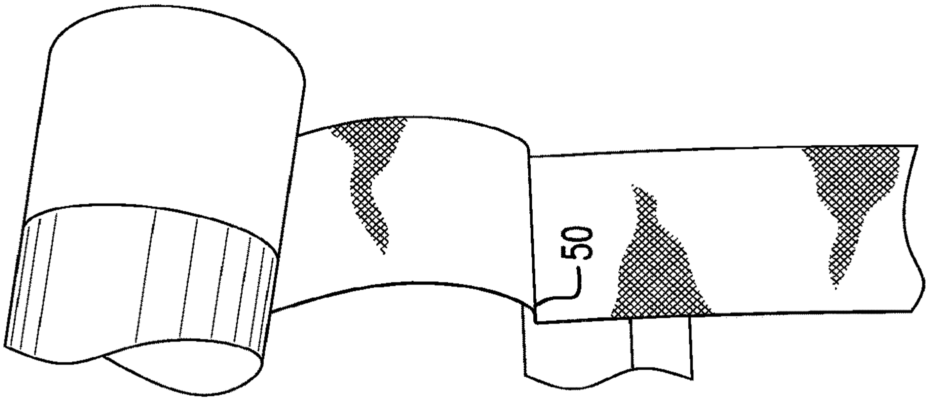
Figure 8A:
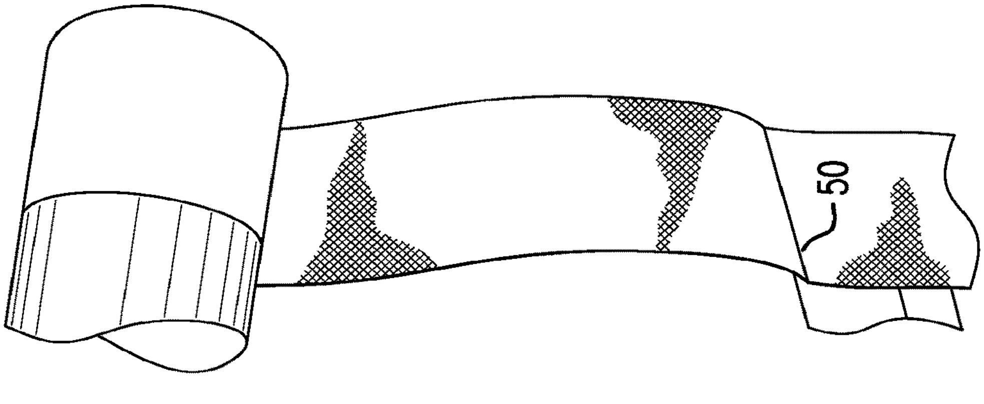

In accordance with a further aspect, as illustrated in FIG. 4, a plurality of the slats 60, and if desired, all of the slats 60 can have an elongate, flexible generally planar body 62 that has an inner edge 64 attached to the first inner elongate tape 40, an outer edge 66 attached to the first outer elongate tape 30, and side edges 68 joining the inner edge and outer edge. In some implementations, at least one of an inner edge region 64*a* along the inner edge 64 of at least one slat 60 and an outer edge region 66*a* along the outer edge 66 of the at least one slat 60 can be stiffer than a region 62*a* (e.g., the central longitudinal region) between the inner edge 64 and outer edge 66 of the at least one slat 60, such that the slat hangs freely when not under tension. As illustrated in the Figures, the slats 60 take on an "S" or "Z"-shaped cross section depending on how much tension they are under. Such flexibility of slats 60 can provide a versatile geometry for the roll-up covering. In some implementations, at least one of the inner edge region 64*a* and the outer edge region 66*a* can include at least one elongate stiffener 80 (FIG. 6) for increasing the stiffness of the at least one slat. The at least one elongate stiffener has a first end 82, a second end 84, a lower edge 86 and an upper edge 88. The stiffener 80, as depicted, defines a length and a central lateral axis "LX" along its length. Thus, the inner edge 64, outer edge 66, or both edges 64, 66 can be provided with one or more such stiffeners 80. The stiffeners in FIG. 6 are embedded within the fabric of the slat 60, cut have a concavity that faces inwardly toward the roller 20 when the subassembly 70 is rolled up. In other implementations, the concavity of both stiffeners can face in the same direction as illustrated in the exemplary embodiment of FIGS. 13-15 and 19.

As will be appreciated, the cross section of the stiffener 80 is generally vertically oriented, and provides a substantial sectional modulus and rigidity to the slats 60. As illustrated, the stiffeners can be substantially planar (e.g., flat, crowned, creased, and the like) and lay in substantially the same plane as one of the first central longitudinal axis X1 of the first outer elongate tape 30 and the second central longitudinal axis X2 of the first inner elongate tape. The at least one stiffener 80 can further define a width perpendicular to the length, and a thickness perpendicular to the width and the length, as clearly evident from the Figures. The stiffener 80 can have a curved cross section in a plane perpendicular to the central lateral axis (e.g. be "crowned") such that a first curved planar face of the at least one elongate stiffener can be convex and a second, opposite curved planar face of the at least one elongate stiffener can be concave. The concave face of the at least one stiffener preferably faces the roller 20 when the sub assembly 70 is rolled up around the roller. The concave face of the stiffener 80 can have a radius of curvature "r" that substantially matches a radius of curvature of the roller 20. As illustrated, the at least one stiffener 80 has a thickness that is substantially smaller than its width.

As illustrated, each of the slats 60 includes stiffeners along each edge, and the concave faces of the stiffeners face the same way and are configured to face and engage with a curved surface defined by the roller 20 when the sub assembly 70 is retracted around the roller 20.

Figure 3:
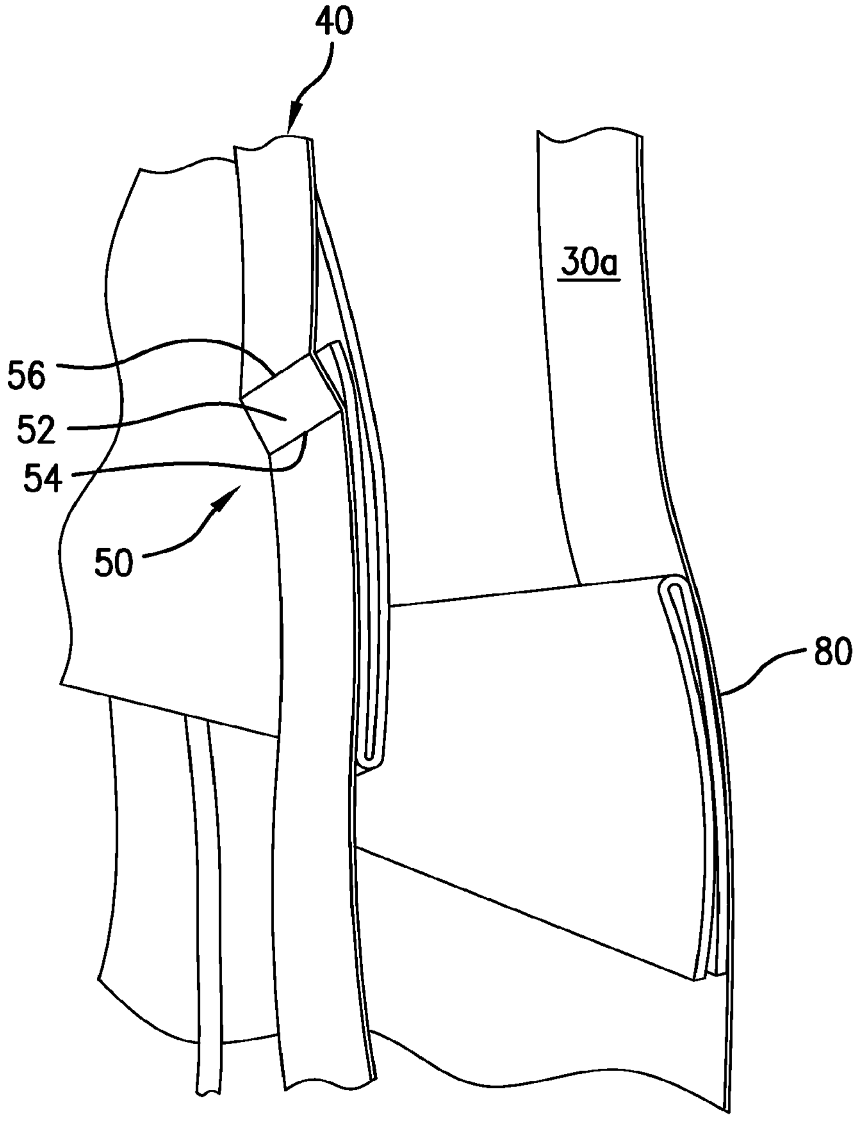
FIG. 3 depicts a close up view of a portion of the embodiment of FIG. 1 illustrating a hinge section of the first inner elongate tape.

As illustrated in FIG. 3, the flexible material of the slats 60 can be disposed between and attached to an outwardly facing face 4*oa* of the first inner tape 40 and aninwardly-facing concave face of a first stiffener along the inner edge 64 of the slat 60. If desired, the first stiffener 80 can be disposed in a sleeve as depicted in FIG. 3 (such as by folding over the fabric of the slat 60) that is defined along an interior portion of the slat 60. The flexible fabric material of the slat 60 can similarly be disposed between and attached to an inwardly facing face of the first outer tape and an outwardly-facing convex face of the second stiffener 80 along the outer edge 66 of the second slat 80, among other possible configurations. The flexible fabric material of the slats 60 can be attached to the tapes along a two dimensional contact or bonding area 89 (FIG. 6) that lies within the plane of the tapes. For example, the contact or bonding area 89 can be generally rectangularly-shaped, triangularly shaped. "X"-shaped, "L"-shaped, as desired. The flexible fabric material of the slats 60 can be attached the tapes 30, 40 by one or more of (i) an adhesive, (ii) at least one fastener, (iii) stitching, (iv) three dimensional weaving and (v) ultrasonic welding.

In accordance with a further aspect, at least one of the slats can include at least one transverse stiffener 90 attached to the at least one slat (FIG. 7) in a region of the slat 60 disposed between the first outer elongate tape 30 and first inner elongate tape 40. Any desired number of slats 60 can be provided with the stiffener 90 in order to help maintain uniform spacing between the tapes 30, 40 when the sub assembly 70 is deployed. In one embodiment, one or more such transverse stiffeners 90 can be provided in, on or under a top slat (FIG. 7) in the sub-assembly 70 to resist an inwardly compressive force arising from a combination of the weight of the sub assembly acting in concert with an angulation of the inner and outer tapes 30, 40 proximate the roller 20. As will be appreciated, in the region of the top slat, the top slat, inner and outer tapes essentially form a triangle with the roller at its apex. As such, a substantial lateral compressive force (front to back) is experienced by the stiffener 90.

As depicted in the figures, the stiffener is further positioned between the stiffeners along the edges of the top slat 60, thus ensuring that the top slat 60 can maintain its shape during and after deployment. When the transverse stiffener 90 is disposed on an upper slat in the sub assembly, the at least one transverse stiffener is thus adapted to maintain the upper slat in a generally open condition, and causes the first outer elongate tape 30 to be separated from the first inner elongate tape 40. If desired, and as presented in the Figures, the transverse stiffener 90 can be disposed across the slat 60 between the first outer elongate tape 30 and the first inner elongate tape 40 to act as a strut to separate the tapes 30, 40. Moreover the transverse stiffener 90 can be crowned similar to the stiffeners 80 for enhanced sectional modulus and column strength. Preferably, and as illustrated, the transverse stiffener 90 is a crowned member that can buckle or otherwise collapse and roll up around the roller when the sub assembly is retracted around the roller.

As illustrated in the Figures, the first inner elongate tape and first outer elongate tape are aligned behind each other such that they roll on top of each other when the sub-assembly 70 is retracted around the roller 20. In an alternative embodiment (not shown) the first inner elongate tape 40 and first outer elongate tape 30 can be laterally displaced from each other along the length of the slats such that they are not behind each other, and do not roll on top of each other when the sub-assembly is retracted around the roller. In accordance with a further example, the first inner elongate tape and first outer elongate tape can have different lateral widths (not shown), such as from about 5 mm to about 100 mm in increments of 1 mm. Furthermore, a different number of tapes can be provided along the back of the slats as compared to the front. For example, two outer tapes can be provided along the edges of the subassembly, and a single inner tape can be provided along the center of the subassembly 70.

Figure 9B:
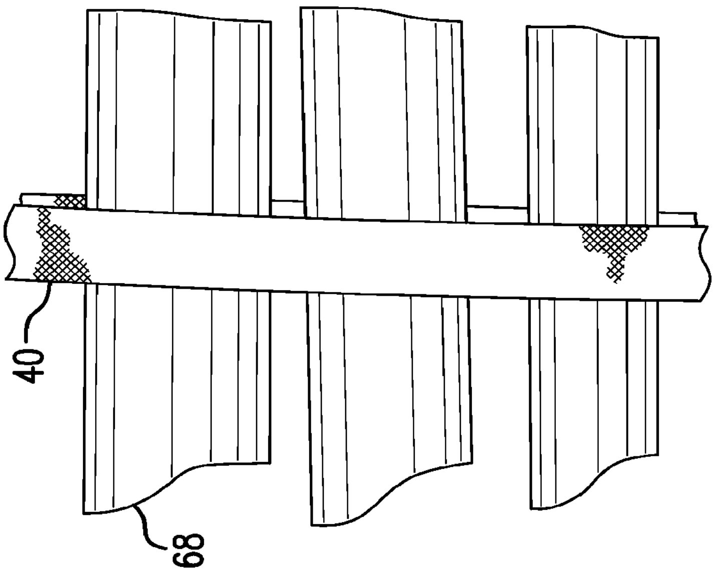
FIGS. 9A-9B illustrate embodiments of a roll up covering including a single pair of tapes disposed along the middle of the slats.
Figure 9A:
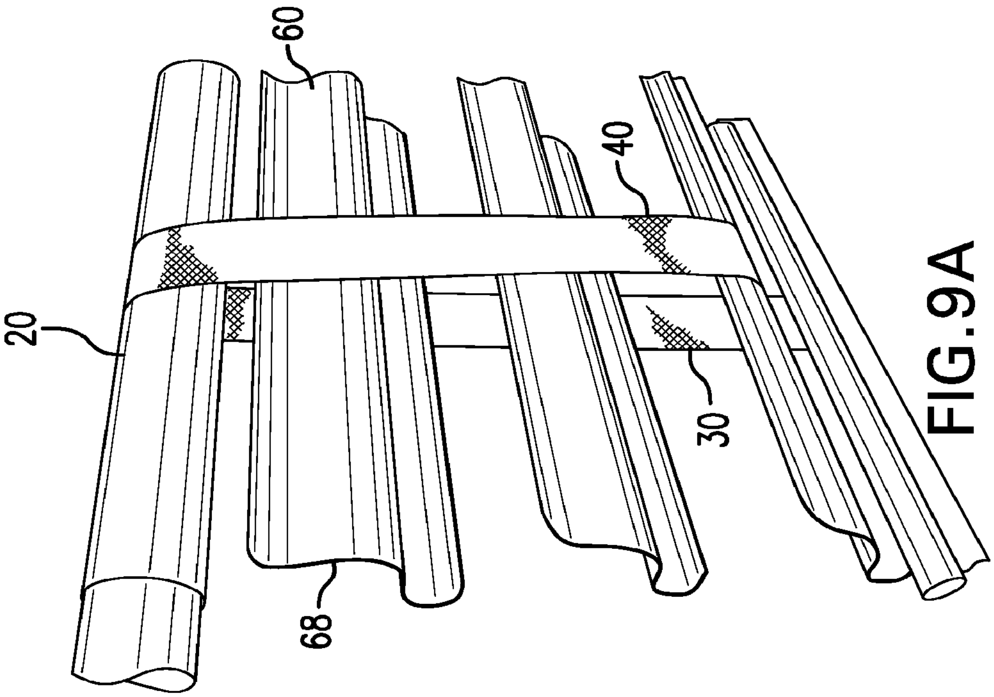

In accordance with one embodiment, and as illustrated in FIGS. 9A-B, the first inner elongate tape 40 and first outer elongate tape 30 can be attached proximate to a center of the roller 20 between the first end 22 and the second end 24 of the roller 20.

As illustrated, the ends 68 of the slats 60 of this embodiment are freely floating by virtue of using one or more stiffeners 80 along the edges 64, 66 of each slat 60. As is evident, the slats 60 can be plainly colored or can have a pattern printed on them.

In accordance with another embodiment, and as illustrated in FIGS. 7A-E, the first inner elongate tape 40 and first outer elongate tape 30 are attached to the roller at a first end of the slats. As illustrated, the roll up covering further includes a second outer elongate tape 130 having a first end 132, a second end 134, and defining a length between the first end and the second end. The second outer elongate tape 130 can further define a lateral width, a thickness and a third central longitudinal axis "X3" between the first end 132 and second end 134 of the second outer elongate tape 130.

The first end 132 of the second outer elongate tape 130 can be attached to the roller 20 such that the third central longitudinal axis X3 of the second outer elongate tape 130 can be oriented generally orthogonally with respect to the central rotational axis R of the roller 20, and be displaced laterally along the roller from the first outer elongate tape 30, such as at the second end of the roller 20, or another location. As illustrated, the roll up covering further includes a second inner elongate tape 140 disposed proximate to the second outer elongate tape 130. The second inner elongate tape 140 can have a first end 142, a second end 144, and define a length between the first end 142 and the second end 144. The second inner elongate tape 140 can further define a lateral width, a thickness and a fourth central longitudinal axis X4 between the first end 142 and second end 144 of the second inner elongate tape 140. The second inner elongate tape 140 can further define a plurality of collapsible hinge segments 150 disposed along the length of the second inner elongate tape 140. The collapsible hinge segments 150 are the same in operation as hinge segments 50. As illustrated, the second inner elongate tape 140 and second outer elongate tape 130 are attached proximate to a second end of the slats 60.

As further illustrated in FIGS. 1A-1B, the roll-up covering can further include a third outer elongate tape 230 having a first end 232, a second end 234, and defining a length between the first end 232 and the second end 234. The third outer elongate tape 230 can further define a lateral width, a thickness and a fifth central longitudinal axis X5 between the first end 232 and second end 234 of the third outer elongate tape 230. The first end 232 of the third outer elongate tape 230 can be attached to the roller 20 such that the fifth central longitudinal axis X5 of the third outer elongate tape 230 can be oriented generally orthogonally with respect to the central rotational axis R of the roller 20. As illustrated, the roll-up window covering still further includes a third inner elongate tape 240 disposed proximate to the third outer elongate tape 230. The third inner elongate tape 240 has a first end 242, a second end 244, and defines a length between the first end 242 and the second end 244. The second inner elongate tape 240 can further define a lateral width, a thickness and a sixth central longitudinal axis X6 between the first end 242 and second end 244 of the third inner elongate tape 240. The third inner elongate tape 240 can further define a plurality of collapsible hinge segments 250 disposed along the length of the third inner elongate tape. The collapsible hinge segments 250 are the same in operation as hinge segments 50 and 150. As illustrated, the third inner elongate tape 240 and third outer elongate tape 230 are attached proximate to central region of the slats 60.

As further illustrated in the Figures, the roll-up covering can further include a weight 95 proximate to the second ends of the first, second, and/or third inner elongate tapes 34, 44, 134, 144, 234, 244. The weight is preferably configured to maintain tension on the first inner elongate tape. The weight can be of any shape, but for purposes of simplicity it can be a weighted bar that spans the width of the roll-upcovering. For purposes of illustration, and not limitation, In accordance with still further aspects, each of the aforementioned plurality of collapsible hinge segments 50, 150, 250 can be disposed proximate to a slat 60 in the sub assembly 70. In some implementations, each hinge segment 50, 250, 350 can be defined by a plurality of spaced apart transverse crease lines 54, 56, 154, 156, 254, 256 defined in the applicable tape 40, 140, 240 inner elongate tape. In some implementations, the hinge segment(s) can fold downward onto an exterior face 40*b*, 140*b*, 240*b* of the inner elongate tape(s) when the subassembly 70 is rolled onto the roller. In some embodiments, a lower crease line 54, 154, 254 defining the hinge segment can be disposed proximate to an inner transverse edge 64 of one or more of the slats 60. If desired, the lower crease line(s) can be disposed immediately above a region where the first inner elongate tape is attached to the transverse edge of the slat.

In accordance with a further aspect, the slats are preferably formed from a flexible fabric material. The stiffeners 80, 90 can be formed, for example, from at least one of a rigid plastic material, a metallic material, such as aluminum, titanium, brass or steel, or the like.

The tapes 30, 40, 130, 140, 230, 240 are preferably made from a flexible material. If desired, the crease lines 54, 56, 154, 156, 254, 256 can be crush formed into the flexible material. For example, the flexible material can be selected from the group including films and textiles. If desired, the textile can be selected from the group consisting of knits, wovens and non-wovens. The flexible material used for the tapes 30, 40, 130, 140, 230, 240 preferably have a thickness between about 1-30 mils, 1.5-25 mils, 2-25 mils, 3-20 mils, 4-18 mils, 6-16 mils, 8-14 mils, and about 10-12 mils.

In some embodiments, the tapes 30, 40, 130, 140, 230, 240 and slats 60 can be made from a woven material such as a Roe-Lon® blackout drapery liner material, manufactured by Rockland Industries, Inc. (1601 Edison Hwy Baltimore, MD 21213, (410) 522-2505). In some implementations, the stiffeners 80, 90 can be polymeric or aluminum crowned blind slats that are about 0.008 inches thick and 16 mm wide. In alternative embodiments, the width of the stiffeners 80, 90 can vary from about 3/16 of an inch to about 5/8 inch or up to about one inch. A larger stiffener width can be appropriate, particularly for slats of larger depth (e.g., 4, 4.5, 5, 5.5 or 6 inches).

In accordance with further aspects of the disclosure, subsequent slats 60 can be separated by a substantially uniform distance along the first outer elongate tape 30 and the first inner elongate tape 40. If desired, such a distance can be a standard distance (e.g., 60 mm, 72 mm), or the spacing can be customized to any desired length, as subsequent slats can be overlapped to any desired extent, such as about 5%, 10%, 15%, 20%, 25%, 30%, 35%, 40%, 45%, 50% or any increment therebetween of 1%. Thus, a custom roll-up covering 10 may be provided wherein the spacing between adjacent slats is determined by dividing a total custom height of the subassembly by a number of desired slats. Thus, it is possible to provide a custom subassembly of custom height with a custom, uniform distance between the slats.

Figure 10A:
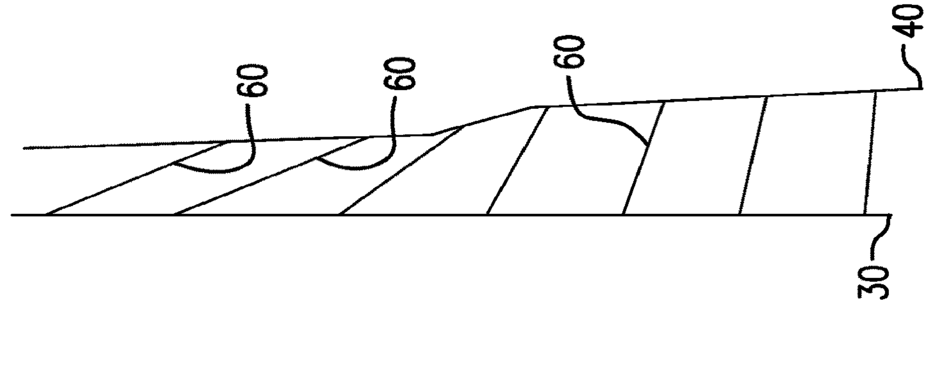
FIGS. 10A-10B are schematic illustrations of non-uniform placement of slats.
Figure 10B:
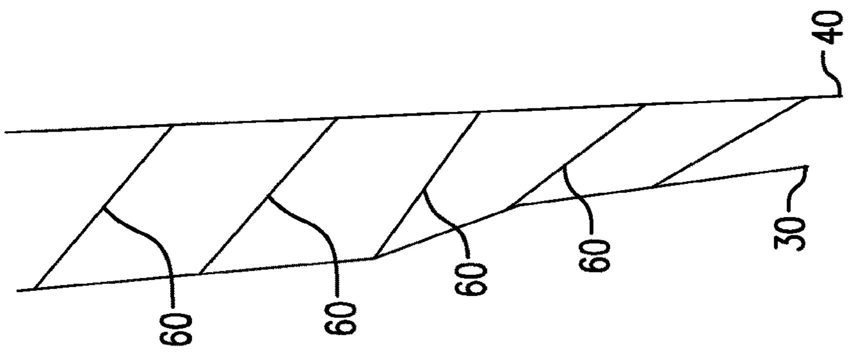

In accordance with a further aspect, and as illustrated in FIGS. 10A-10B, subsequent slats 60 of a constant depth can be separated by a non-uniform distance along at least one of the first outer elongate tape and the first inner elongate tape. If desired, the spacing between subsequent slats can be selected to cause the slats to open at different rates, or one set of slats before a second set of slats, for example, such that light will be permitted to pass through a first portion of the roll up covering before passing through a second portion of the roll up covering. For example, the spacing can be adjusted so that upper slats open first and the lower slats stay closed, or the opposite.

Figure 11A:
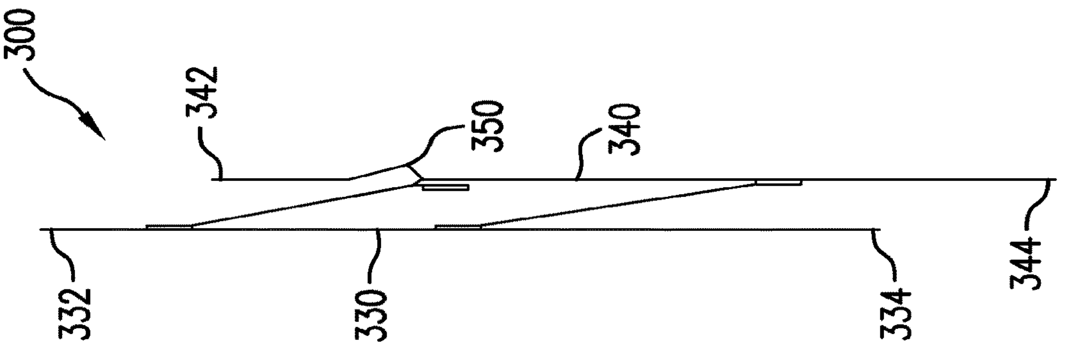
FIGS. 11A-11C are schematic illustrations of an exemplary ladder tape.
Figure 11B:
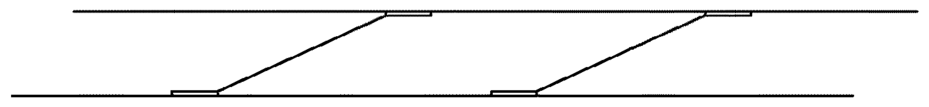
Figure 11C:
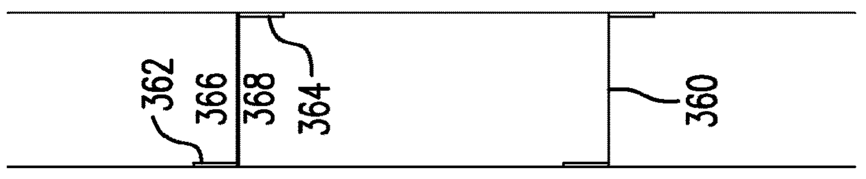

In further accordance with the disclosure, and as illustrated in FIGS. 11A-11C, an exemplary ladder tape 300 is provided. Such a ladder tape 300 can be configured to be biased to close, and to roll up onto itself. For example, such a ladder tape 300 can include a first elongate tape 330 having a first end 332, a second end 334, and defining a length between the first end and the second end, the first elongate tape further defining a lateral width, a thickness and a first central longitudinal axis between the first end 332 and second end 334 of the first outer elongate tape 330, the first end 332 of the first elongate tape 330 being configured to be attached to a roller (e.g., 20). The ladder tape 300 can further include a second elongate tape 340 disposed parallel to the first elongate tape 330. The second elongate tape 340 has a first end 342, a second end 344, and defines a length between the first end 342 and the second end 344. The second elongate tape 340 further defines a lateral width, a thickness and a second central longitudinal axis between the first end 342 and second end 344 of the second elongate tape 300. The second elongate tape 300 further defines a plurality of collapsible hinge segments 350 disposed along the length of the second elongate tape 340. The collapsible hinge segments 350 are the same in operation as hinge segments 50, 150, 250. The ladder tape 300 can further include a plurality of connectors 360 disposed between and coupled to the first elongate tape 330 and the second elongate tape 340 along the length of the tapes 330, 340, the tapes 330, 340 and connectors 360 cooperating to form a ladder tape 300 suitable for receiving slats (not shown) to make ablind. If desired, at least one of the connectors 360 can include a flexible fabric body having a first end 362, a second end 364, a first planar face 366 and a second planar face 368. The first planar face 366 can be attached to an inwardly facing face of the first elongate tape 330 at the first end 362, and the second planar face 368 can be attached to an inwardly facing face of the second elongate tape 340 at the second end 364. The ladder tape 300 can thus be biased to fold into a planar configuration. If desired, the connectors can assume a "Z" or "S" shape when the ladder tape is deployed.

Figure 12:
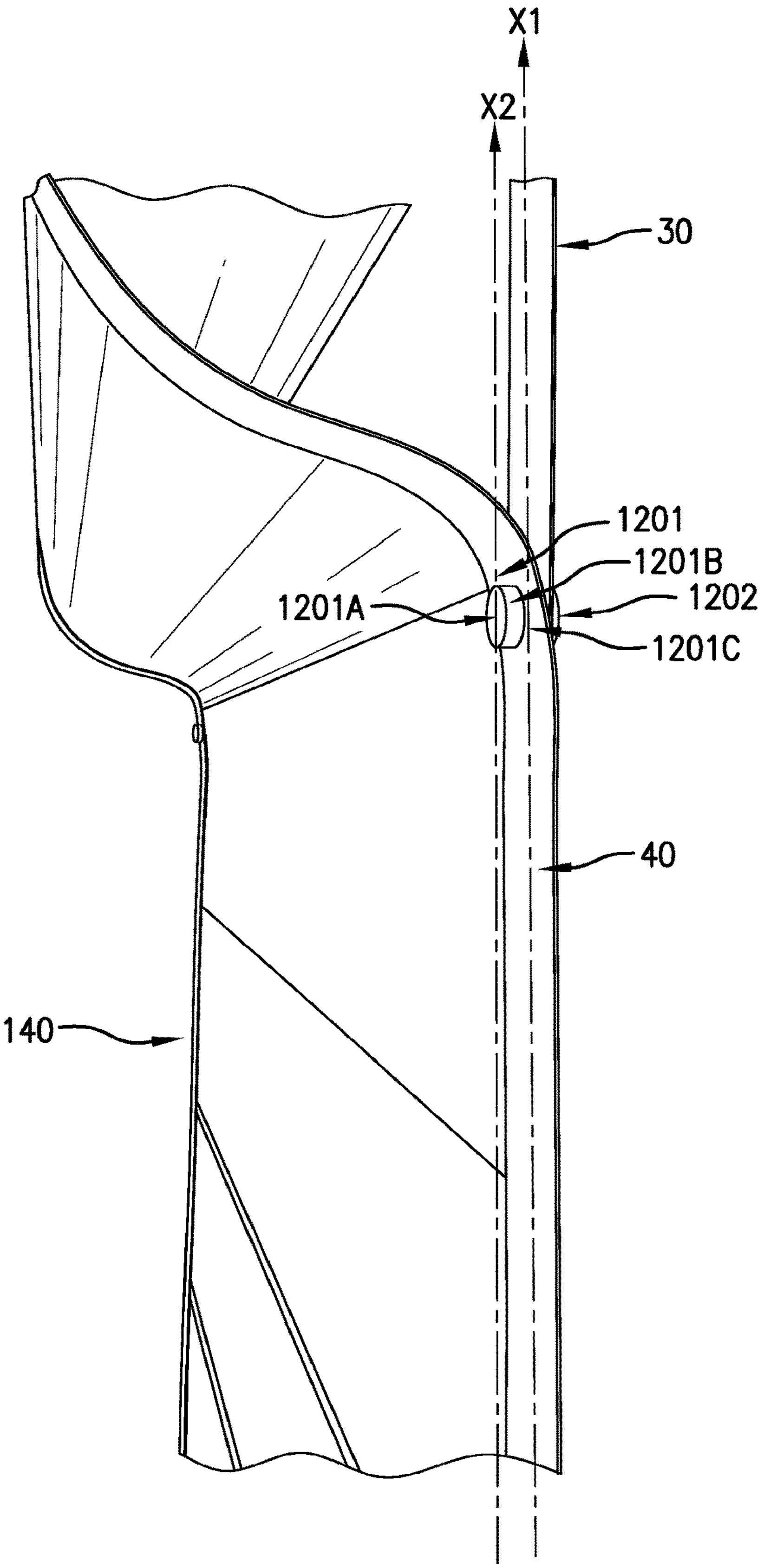
FIG. 12 illustrates an embodiment of a pair of magnetic connectors that can be disposed on opposing outward surfaces of the elongate tapes to selectively close the plurality of slats.

FIG. 12 illustrates a further exemplary embodiment of a roll up covering in accordance with the present disclosure in which a pair (first and second) of magnetic connectors are disposed opposite of one another such that a first connector 1201 of the pair of magnetic connectors 1201 and 1202 can be disposed and movable on an outer surface of the first inner elongate tape 40 and a second connector 1202 of the pair of magnetic connectors 1201 and 1202 can be disposed and movable on an outer surface of the first outer elongate tape 30 in response to and coordinated with the movement of the first connector 1201. In an exemplary embodiment of the present disclosure, the first connector 1201 and the second connector 1202 are magnetic discs of the same diameter, each with a circular surface, e.g., 1201.A, corresponding to another circular surface, e.g., 1201C, connected by a circumferential surface 1201B. In a preferred embodiment of the present disclosure, circular surfaces 1201.A and 1201C of the first connector 1201 and second connector 1202 can be of the same radius dimension, e.g., 1201R.

In another embodiment of the present disclosure, the first connector 1201 has at least one metallic or magnetic contact surface, i.e., 1201.A or 1201C, which is attracted to at least one metallic or magnetic contact surface of the second connector 1202. In the preferred embodiment of the present disclosure, the magnetic attraction between the at least one metallic or magnetic contact surface, i.e., 1201.A or 1201C, of the first connector 1201 and the at least one metallic or magnetic contact surface of the second connector 1202 maintains the first connector 1201 and the second connector 1202 collapsed together. In another embodiment of the present disclosure, the first and second connectors 1201 and 1202 have sufficient magnetic forces attracting one and another such that moving one of the pair of magnetic connectors 1201 and 1202 can cause coordinated move of the other one of the pair of magnetic connectors 1201 and 1202. It will be appreciated that the illustrated magnets are permanent magnets. Any suitable permanent magnets can be used, such as those including rare earth elements and the like. If desired, one of the magnets can be replaced with a piece of steel, preferably one that has been plated or lightly coated with a corrosion resistant layer.

In accordance with an exemplary embodiment, the coordinated upward movement of the first and second connectors 1201 and 1202 can cause the side edges 68 of the plurality of slats 60 to collapse against the first inner elongate tape 40 and first outer elongate tape 30, thus causing the plurality of slats 60 to be in a closed position.

The downward movement of the first and second connectors 1201 and 1202 can cause the side edges 68 of the plurality of slats 60 to separate from the first inner elongate tape 40 and first outer elongate tape 30, thus causing the plurality of slats 60 to be in an open position. In the illustrated embodiment, the first connector 1201 can be movable along the second central longitudinal axis X2, and second connector 1202 can be movable along the first central longitudinal axis X1. In another embodiment of the present disclosure, the pair of magnetic connectors 1201 and 1202 can be removable from the first outer elongate tape 30 and the first inner elongate tape 40. Selective placement of the magnets can provide for any desired combination of privacy (below the magnets) and shading (above the magnets). It will be further appreciated that any of the disclosed roll up coverings can have slats that extend outwardly beyond the tapes that have freely floating ends. For example, the embodiments of FIG. 9 illustrate an embodiment with freely floating ends.

It will be further appreciated that some or all of the pairs of elongate tapes can be provided with pairs of magnets to selectively hold the tapes together. Thus, a roll up covering with two pairs of tapes would have four magnets, a covering with three pairs of tapes would have six magnets, and so on. It will be further appreciated that a clip or other suitable sliding fastener can be positioned over the tapes rather than magnets (or a magnet and opposing steel disc) if the tapes are at the edge of the roll up covering.

In accordance with a further embodiment of the present disclosure, for purposes of illustration, a second pair of magnetic connectors can be disposed opposite of one another such that a third connector 1203 of the second pair of magnetic connectors 1203 and 1204 can be disposed and movable on an outer surface of the second inner elongate tape 140 and a second connector 1204 of the second pair of magnetic connectors 1203 and 1204 can be disposed and movable on an outer surface of the second outer elongate tape 130 in response to and coordinated with the movement of the third connector 1203. In an exemplary embodiment of the present disclosure, the third connector 1203 and the fourth connector 1204 are magnetic discs of the same dimension, each with a circular surface, e.g., 1203A, corresponding to another circular surface, e.g., 1203C, connected by a transverse circular rim surface 1203B. In a preferred embodiment of the present disclosure, circular surfaces 1203A and 1203C of the third connector 1203 and fourth connector 1204 can be of the same radius dimension, e.g., 1203R. In another embodiment of the present disclosure, the third connector 1203 has at least one metallic or magnetic contact surface, i.e., 1203A or 1203C, which is attracted to at least one metallic or magnetic contact surface of the fourth connector 1204. In the preferred embodiment of the present disclosure, the magnetic attraction between the at least one metallic or magnetic contact surface, i.e., 1203A or 1203C, of the third connector 1203 and the at least one metallic or magnetic contact surface of the fourth connector 1204 maintains the third connector 1203 and the fourth connector 1204 collapsed together. In another embodiment of the present disclosure, the third and fourth connectors 1203 and 1204 have sufficient magnetic forces attracting one and another such that moving one of the pair of magnetic connectors 1203 and 1204 can cause coordinated move of the other one of the pair of magnetic connectors 1203 and 1204.

In accordance with an exemplary embodiment, the coordinated upward movement of the third and fourth connectors 1203 and 1204 can cause the side edges 68 of the plurality of slats 60 to collapse against the second inner elongate tape 140 and second outer elongate tape 130, thus causing the plurality of slats 60 to be in a closed position. The downward movement of the third and fourth connectors 1203 and 1204 can cause the side edges 68 of the plurality of slats 60 to separate from the second inner elongate tape 140 and second outer elongate tape 130, thus causing the plurality of slats 60 to be in an open position. In the illustrated embodiment, the third connector 1203 can be movable along the fourth central longitudinal axis X4, and fourth connector 1204 can be movable along the third central longitudinal axis X3. In another embodiment of the present disclosure, the pair of magnetic connectors 1203 and 1204 can be removable from the second outer elongate tape 130 and the second inner elongate tape 140.

Figure 13A:
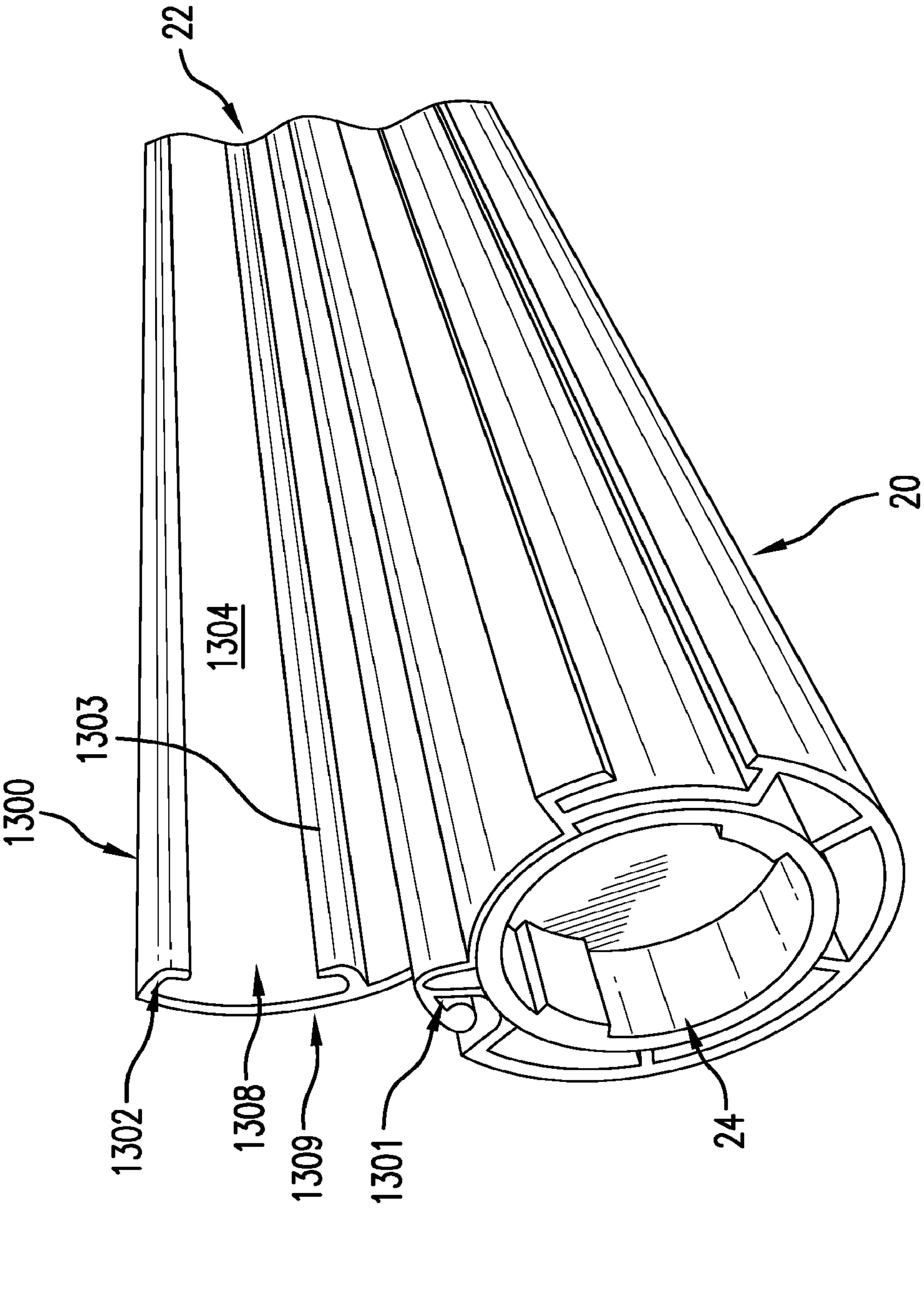
FIGS. 13A-13C illustrate an exemplary embodiment of a door provided on the body of the roller wherein a stiffener covered with a portion of a flexible slat (e.g., fabric overlay) can be disposed on a track provided in the door and a further stiffener covered with another portion of the slat (e.g., fabric) can be disposed on a receiving track formed into the body of the roller.
Figure 13B:
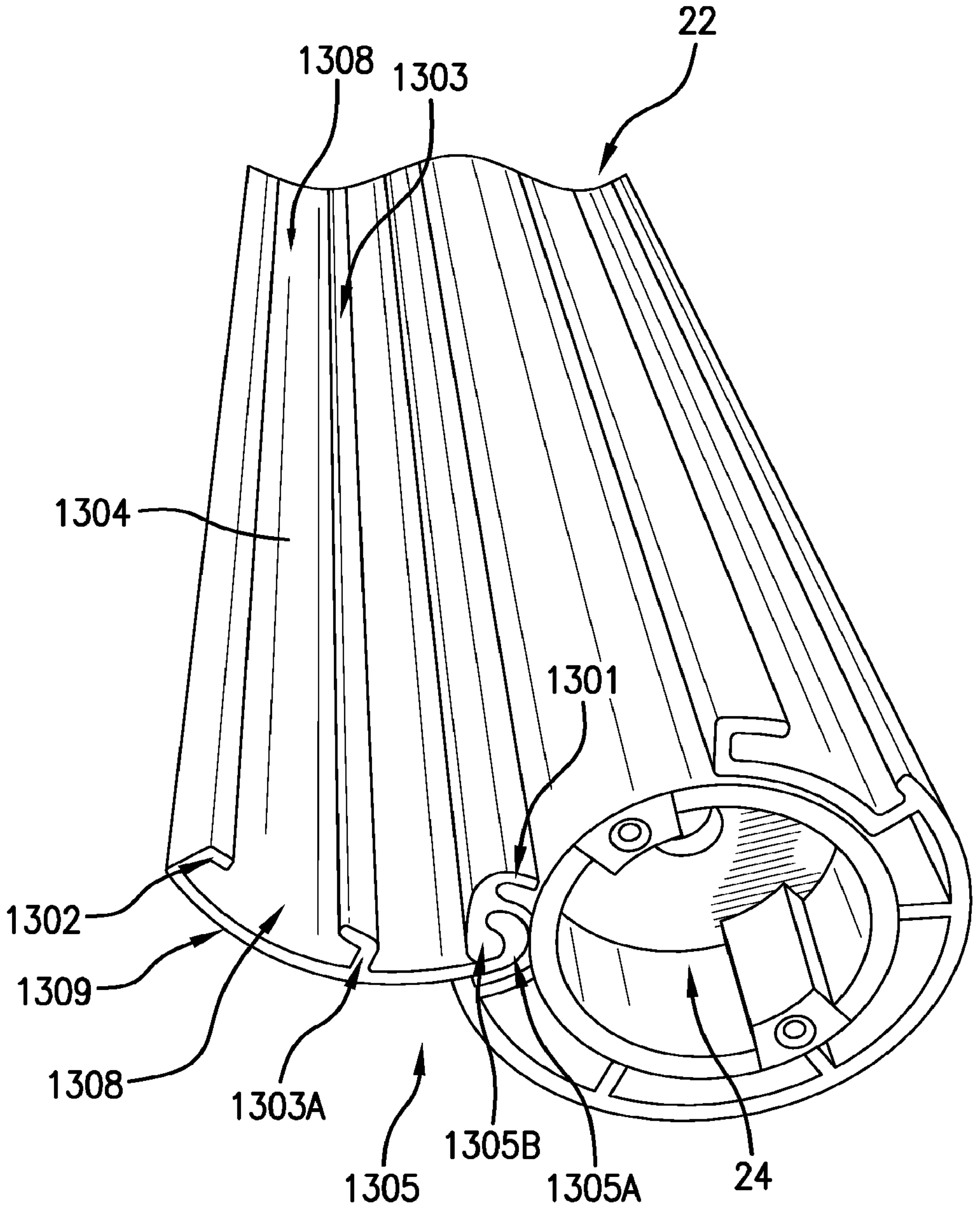
Figure 13C:
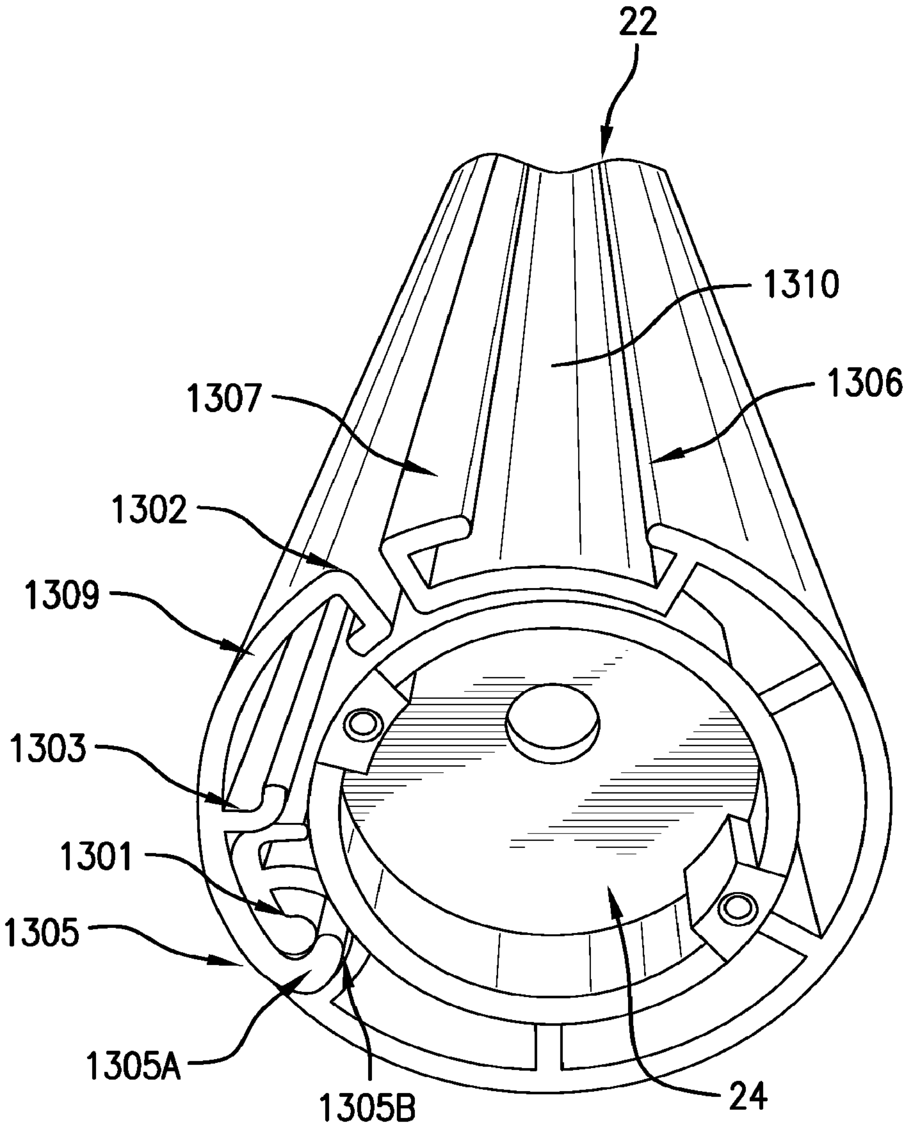

FIGS. 13A-13C illustrate an embodiment of the present disclosure whereby a door 1300 can be provided on the body of the roller 20 such that at least one stiffener 80 covered with a portion of a slat (e.g., fabric overlay) can be disposed on track 1304 provided in the door 1300. In accordance with a preferred embodiment as illustrated in the figures, door 1300 has a width defined by the first end 22 and second end 24 of roller 20, a radial curvature that substantially matches that of roller 20, an inner end 1301, an outer end 1302, a thickness, and a length that is defined between the inner end 1301 and outer end 1302 of the door 1300. It can be further provided that the radial curvature of the door 1300 forms a concave innerface 1308 and a convex outer face 1309 on the door 1300. As illustrated in the exemplary embodiment in FIG. 13B, door 1300 can be attached to roller 20 via a latch element 1305 at the inner end 1301, wherein latch element 1305 can be a concavely curved inner end 1305A of door 1300 on the concave inner face 1308 hooked into a receiving cavity 1305B of the roller 20 for the width of the roller 20.

In accordance with another embodiment, door 1300 can be operable to be opened by detaching or separating from the roller 20 on the outer end 1302 along the width of door 1300 and attaching to the roller at the inner end 1301 via latch element 1305. The door 1300 can be further operable to be closed by collapsing and rolling the outer end 1302 of the door 1300 toward and around the roller 20 along the width of the door 1300.

In a further embodiment of the present disclosure, as shown in FIG. 13B, a raised ridge 1303 can be integrally provided on the concave inner face 1308 of the door 1300 along the width of the door 1300 whereby ridge 1303 and outer end 1302 of the door 1300 form a "C"-shaped track 1304 for the width of the door 1300 and ridge 1303 can have a concaved raised edge 1303A for the width of the door. In a preferred embodiment, the radial curvature of ridge 1303A can substantially match that of the outer end 1302.

In accordance with another embodiment of the present disclosure, as illustrated in FIG. 13C, a "C"-shaped receiving track 1310 can be integrally provided on (e.g., formed into) the body of roller 20 wherein the receiving track 1310 has a width defined by the first end 22 and second end 24 of roller 20, a radial curvature that substantially matches the curvature of roller 20, a first end 1306, a second end 1307, a thickness, and a length defined between the first end 1306 and second end 1307 of the receiving track 1310.

Figure 14A:
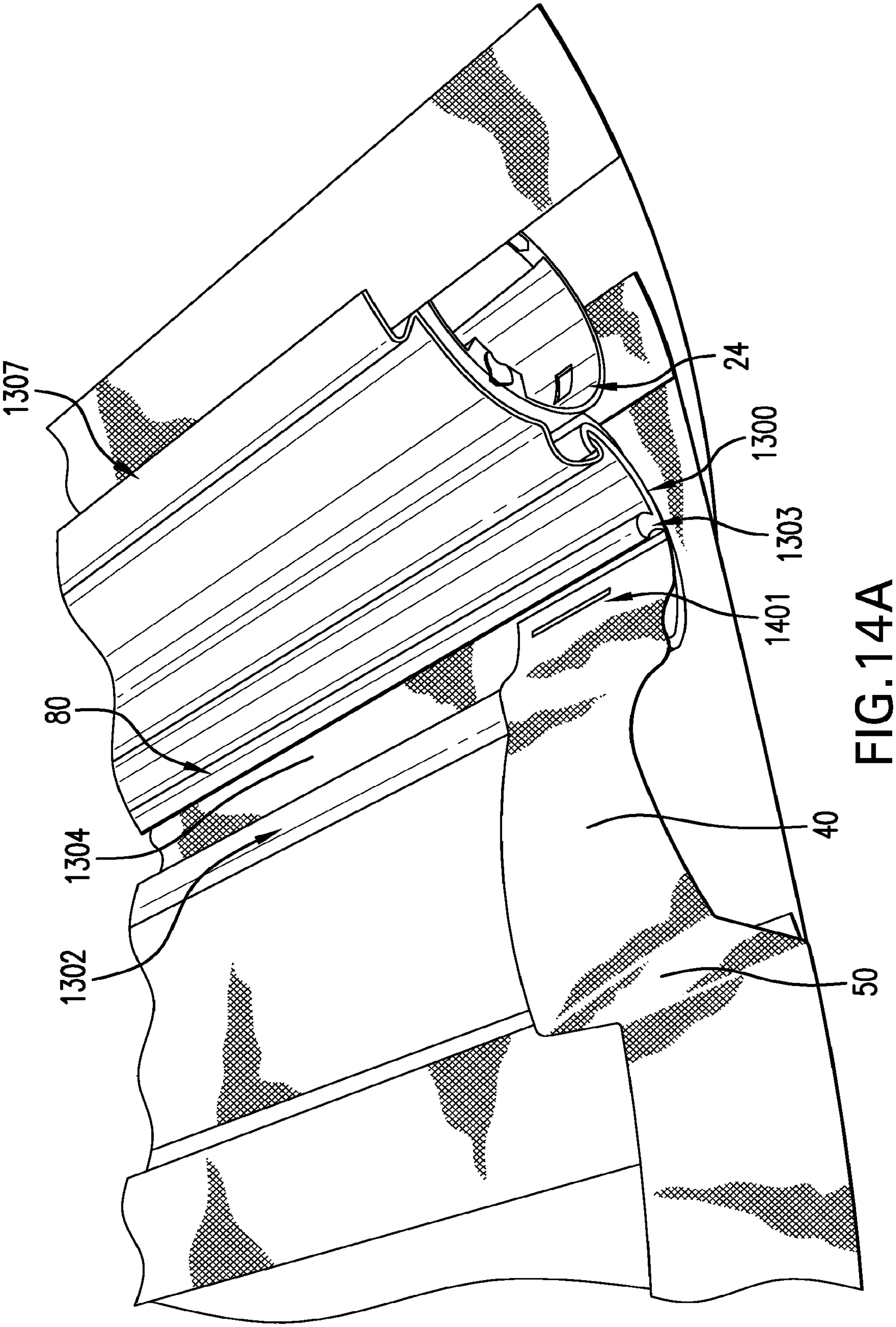
FIGS. 14A and 14B are detailed illustrations of the exemplary embodiment of FIGS. 13A-13C.

As illustrated in details in FIG. 14A at second end 24 of roller 20, in accordance with one embodiment, track 1304 on door 1300 can accommodate at least one elongate stiffener 80 whereby stiffener 80 is covered by a flexible fabric overlay such that the stiffener 80 covered with the overlay can be disposed in track 1304 for the width of the track and the flexible fabric overlay of the stiffener 80 can be attached to an inwardly facing face of the first inner elongate tape 40 by, for example, staple 1401.

Figure 14B:
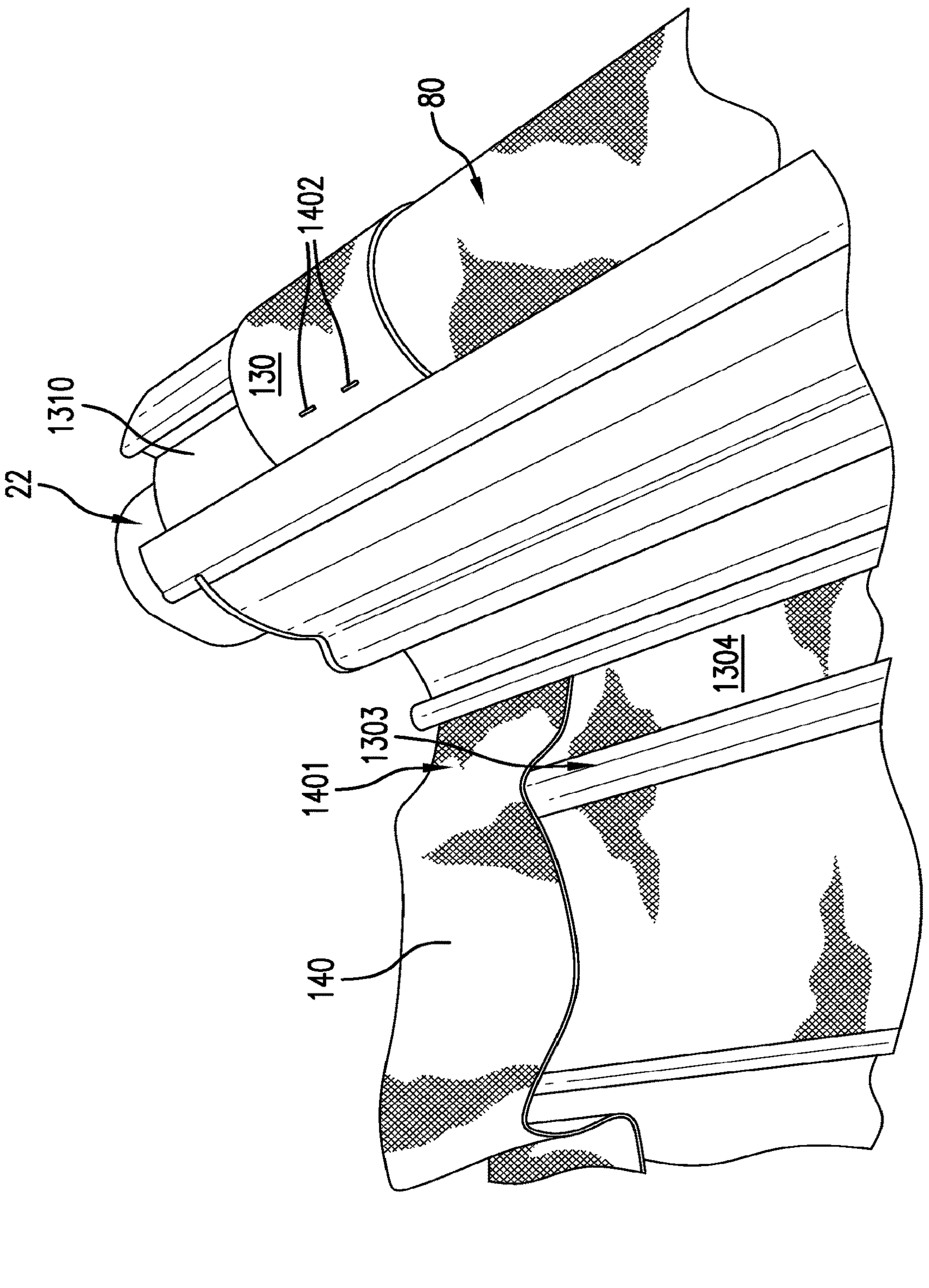

In a further embodiment, as illustrated in FIG. 14B at first end 22 of roller 20, receiving track 1310 on roller 20 can accommodate at least one elongate stiffener 80 whereby stiffener 80 is covered by a portion of a slat (e.g., flexible fabric overlay) such that the stiffener covered with the overlay can be disposed in receiving track 1310 for the width of the receiving track and the flexible fabric overlay of the at least one stiffener 80 is attached to an inwardly facing face of the second outer elongate tape 130 by, for example, staple 1402.

FIGS. 15A-15E depict progressive views of a roll-up covering of the present disclosure that includes a door illustrated in FIGS. 13A-13C in a process of opening from a collapsed position. In accordance with the illustrated embodiment, when door 1300 on roller 20 is in a closed or collapsed position against roller 20, track 1304 and receiving track 1310 are radially aligned next to one another. As illustrated in a collapsed position in FIG. 15A, the roll-up covering 10 has at least one stiffener 80 covered with fabric overlay that is disposed in track 1304 and at least one stiffener 80 covered with fabric overlay that is disposed in track 1310. As further illustrated in FIG. 15B, the flexible fabric overlay covering the at least one stiffener 80 disposed in track 1304 is attached to the first inner elongate tape 40, and the flexible fabric overlay covering the at least one stiffener 80 disposed in track 1310 is attached to the first outer elongate tape 30.

Figure 15A:
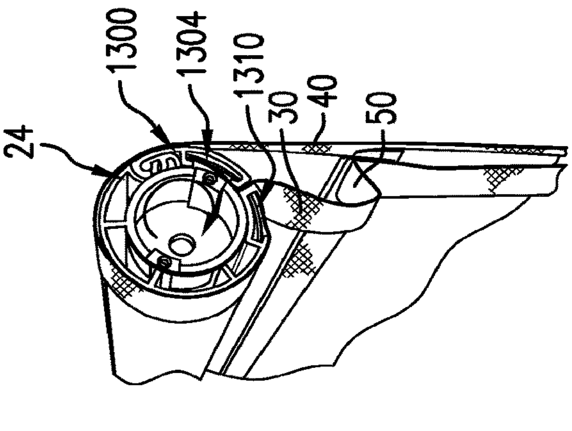
FIGS. 15A-15E depict progressive views of a roll-up covering of the present disclosure that includes a door illustrated in FIGS. 13A-13C in a process of opening from a collapsed position.
Figure 15B:
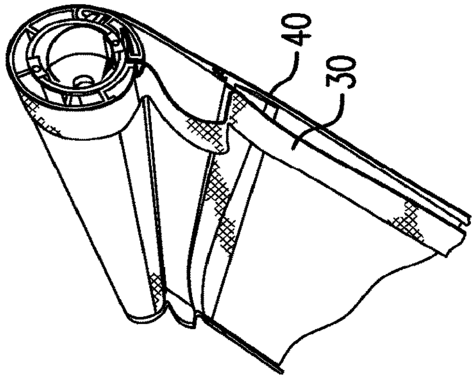
Figure 15C:
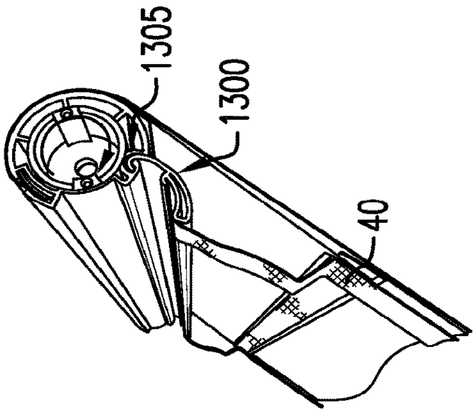

As further illustrated in FIG. 15C, as roller 20 unwinds, door 30 opens such that outer end 1302 becomes detached or separated from the body of roller 20 for the width of the door 1300 and latch element 1305 remains attached or hooked to receiving cavity 1305B via concavely curved inner end 1305A. As also shown in FIG. 15C, when door 30 is in an open position as illustrated, slack from the first inner elongate tape 40 hangs from its attachment to a fabric overlay covering a stiffener 80 that is disposed in track 1304 and the collapsible hinge segment 50 becomes substantially perpendicular to first inner elongate tape 40.

Figure 15D:
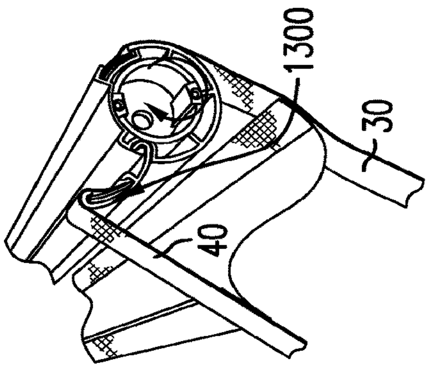

In an illustrated embodiment of the present disclosure, shown in FIG. 15D, as roller 20 further unwinds and door 30 opens to a position where it is substantially perpendicular to the first inner elongate tape 40 and the first outer elongate tape 30, the upper slat of roll-up covering 10 separates from the first inner elongate tape 40 and the first outer elongate tape 30 such that the upper slat becomes substantially parallel to door 1300, and the remaining plurality of slats 60 are in an open position.

Figure 15E:
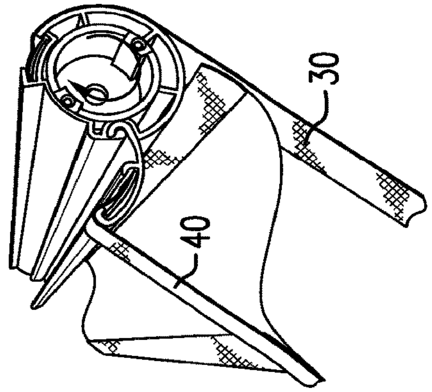

In a further illustrated embodiment of the present disclosure, as show in FIG. 15E, when roller 20 unwinds to a position where door 1300 is in a parallel plane as that of the upper slat of roll-up covering 10, door 1300 maintains the upper slat and roll-up covering 10 in a generally open condition such that the first outer elongate tape 30 is separated from and parallel to the first inner elongate tape 40. It will be appreciated that use of a door within the roller can help facilitate spacing between the inner and outer tapes, achieving wider slats.

In further embodiments, it will be appreciated that the disclosed coverings can be oriented in any desired manner with respect to the architectural opening that it is covering. For example, in some implementations, it can be desirable for the outer surface of the inner elongate tape(s) to face the architectural opening when the covering is unrolled from the roller (e.g., window or door). In other implementations, the outer surface of the outer elongate tape(s) can face the architectural opening.

Figure 16A:
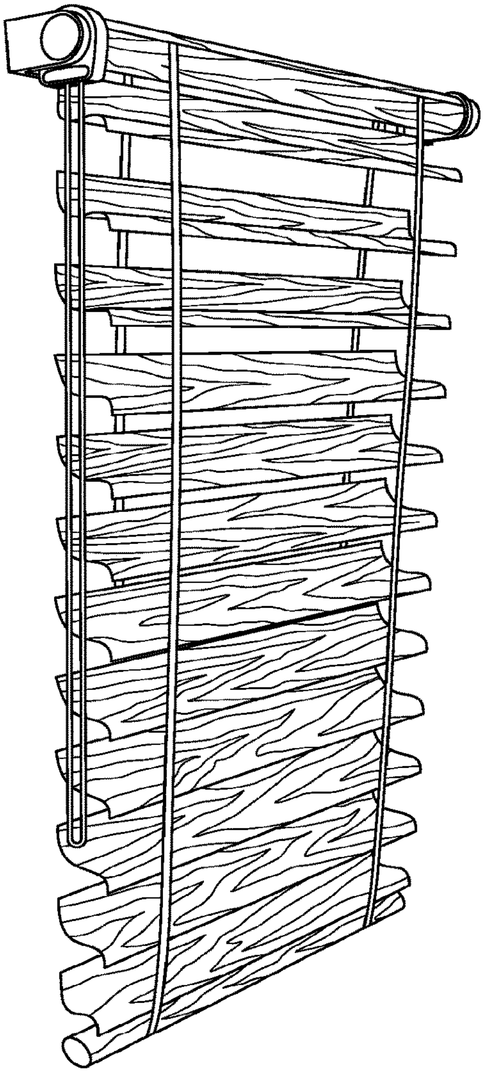
FIGS. 16A-16B illustrate a further embodiment of the disclosure having covering fabric on upper and lower faces of the slats.
Figure 16B:
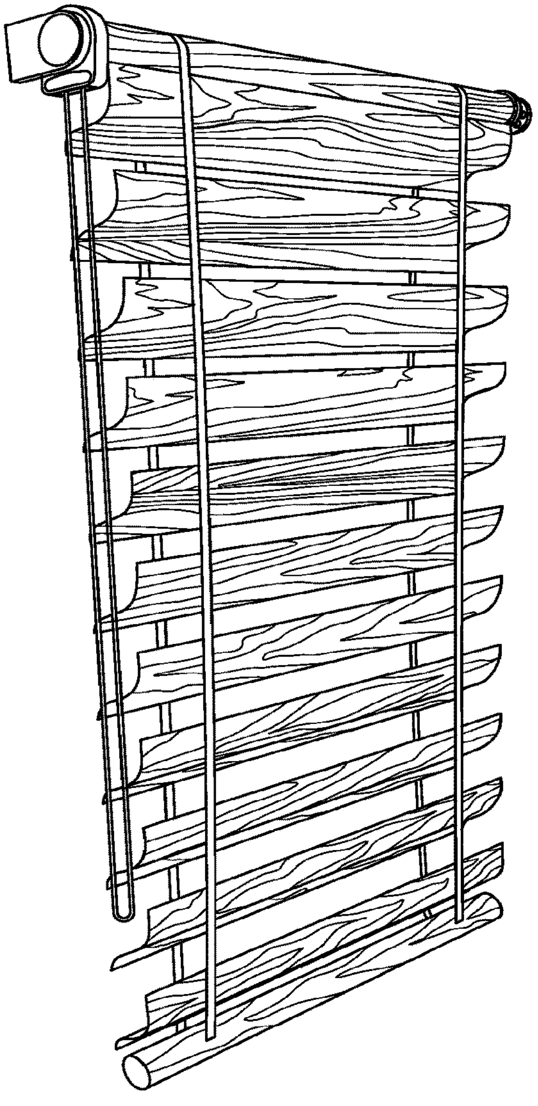
Figure 18:
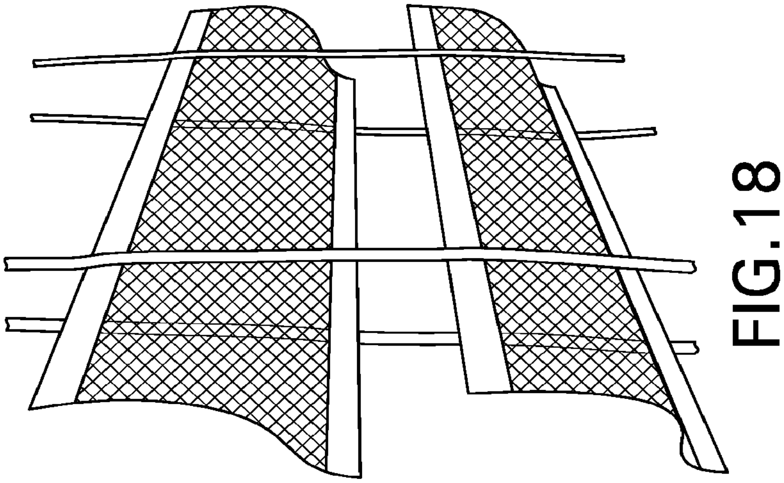
FIG. 18 illustrates an embodiment of a roll up covering with slats made from a "see-through" material.
Figure 17:
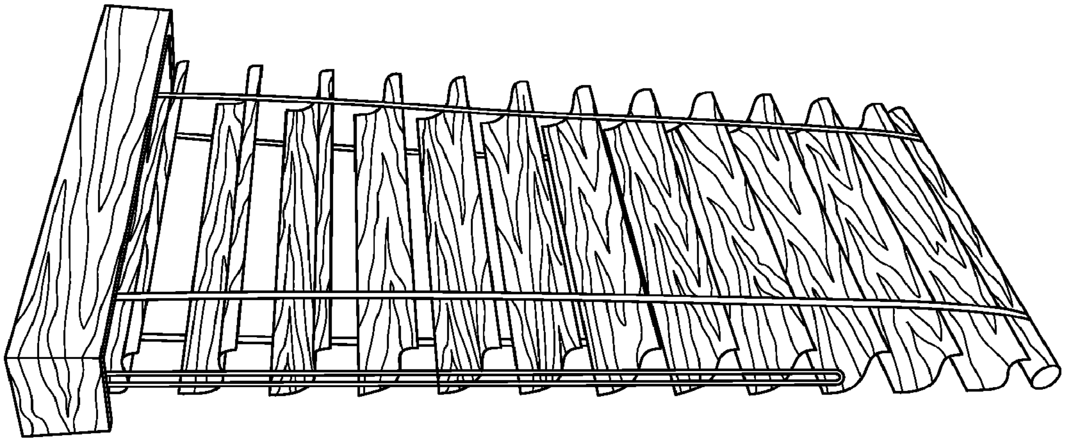
FIG. 17 illustrates the embodiment of FIG. 16A with an optional valance.
Figure 19C:
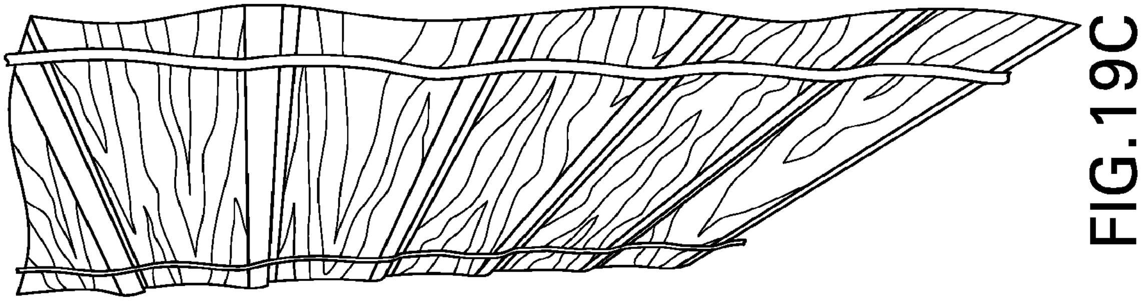
FIGS. 19A-19C show an embodiment of a roll-up covering in various positions.
Figure 19B:
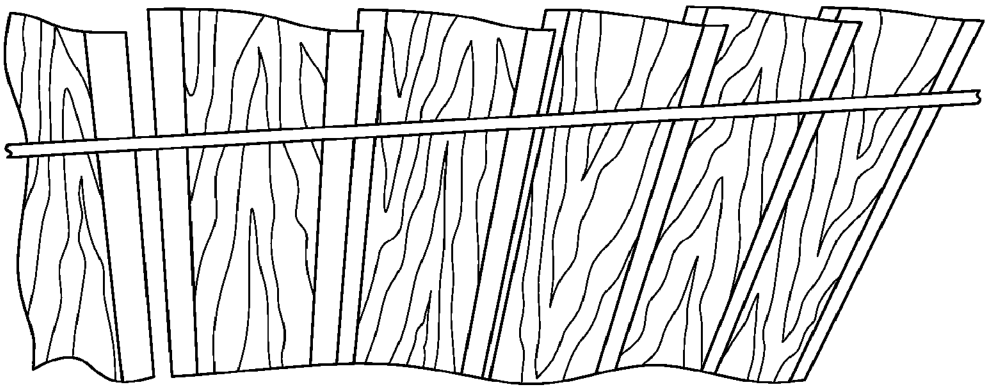
Figure 19A:
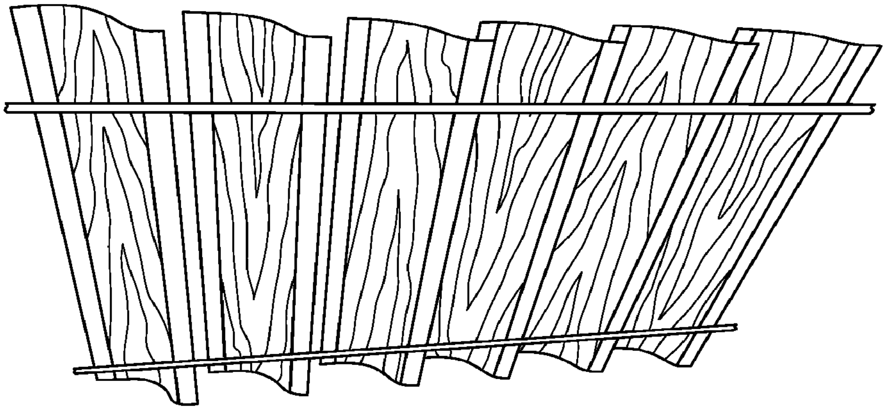

For purposes of illustration, and not limitation, FIGS. 16A-16B illustrate an example of a roll up window covering that can be oriented in either direction with respect to the architectural opening (e.g., window). Both sides of each slat is provided with the same appearance (e.g., wood grain) so that the covering is reversible. Moreover, the top roller and the bottom weight are also covered in the fabric to achieve an aesthetic appearance. FIG. 17 illustrates such a window covering with a valance at the top of the window covering, shielding the roller from view. FIG. 18 illustrates an embodiment of a window covering with slats made from a "see through" material, such as batiste, enlinia, or a rollscreen fabric. FIGS. 19A-19C illustrate a further embodiment of a window covering having stiffeners in the slats having a concavity facing in the same direction (e.g., toward the architectural opening). When closed, the assembly has a very aesthetic appearance as the convexity of the slats and the stiffeners all face away from the architectural opening.

The devices and methods of the present disclosure, as described above and shown in the drawings, provide for roll up window coverings and ladder tapes with superior attributes vis-a-vis the prior art. It will be apparent to those skilled in the art that various modifications and variations can be made in the devices and methods of the present disclosure without departing from the spirit or scope of the disclosure. Thus, it is intended that the present disclosure include modifications and variations that are within the scope of the subject disclosure and equivalents.

What is claimed is:

1. A roll-up covering for an architectural structure, said roll-up covering comprising:

a first pair of elongate tapes comprising a first inner elongate tape and a first outer elongate tape, a second pair of elongate tapes comprising a second inner elongate tape and a second outer elongate tape, and a third elongate tape, each elongate tapes extending vertically and having a first end, a second end, a tape length that extends in a vertical direction from the first end to the second end, a tape width that extends perpendicular to the elongate tape length, and a tape thickness perpendicular to and less than the tape width; and a plurality of flexible slats separately formed from the first pair of elongate tapes, the second pair of elongate tapes, and the third elongate tape, each of the plurality of flexible slats having a first end and a second end, an inner longitudinal edge and an outer longitudinal edge, a slat length extending from the first end to the second end, a slat width that extends from the inner longitudinal edge to the outer longitudinal edge, and an upper face and a lower face defined by the length and width of the respective flexible slat, wherein, the plurality of separately formed flexible slats are each vertically spaced apart along the tape length of each of the first pair of elongate tapes, the second pair of elongate tapes, and the third elongate tape, and each of the plurality of separately formed flexible slats are attached to and supported by the first pair of elongate tapes, the second pair of elongate tapes, and the third elongate tape with the slat length extending horizontally and in the same direction as the tape width;

the greater of the sum total of the tape width of the first inner elongate tape, the second inner elongate tape and the third elongate tape or the sum total of the tape width of the first outer elongate tape, the second outer elongate tape and the third elongate tape is less than half of the slat length of any one of the plurality of flexible slats;

the first pair of elongate tapes are opaque and positioned at or proximate to each respective slat's first end, the second pair of elongate tapes are opaque and positioned at or proximate to each respective slat's second end, and the third elongate tape is opaque and positioned between the first and second elongate tapes; and wherein the plurality of flexible slats are configurable between an open position and a closed position, wherein each flexible slat changes shape as it is configurable between the open position and the closed position where in the open position the slat width of each flexible slat has a curved shape with a middle portion of each flexible slat extending more horizontal than at least one of the-inner and outer longitudinal edges of each flexible slat and in the closed position the slat width of each flexible slat is substantially planar to the elongate tapes; and the upper face of each of the plurality of separately formed, horizontally extending, flexible slats are adhesively attached to one of the first inner elongate tape or the first outer elongate tape and the lower face of each of the plurality of separately formed, horizontally extending, flexible slats are adhesively attached to the respective second inner elongate tape or the second outer elongate tape to bias the plurality of flexible slats into the closed position.

2. The roll-up covering of claim 1, wherein:

each flexible slat has a central region along its slat length located in between the first and second end of each flexible slat; and the third elongate tape is positioned in the central region.

3. The roll-up covering of claim 2, wherein the third elongate tape is positioned and spaced along the slat length of each flexible slat so the distance between the first pair of elongate tapes and the third elongate tape is the same as the distance between the second pair of elongate tapes tape and the third elongate tape.

4. The roll-up covering of claim 1, wherein the first end of each slat does not extend past the first pair of elongate tapes, and the second end of each slat does not extend past the second pair of elongate tapes.

5. The roll-up covering of claim 1, wherein:

each flexible slat has an inner longitudinal region comprising the inner longitudinal edge and an outer longitudinal region comprising the outer longitudinal edge;

the first pair and the second pair of elongate tapes support the inner and outer longitudinal regions of each of the plurality of flexible slats; and the third elongate tape supports at least the other one of the inner longitudinal or outer longitudinal regions.

6. The roll-up covering of claim 1, wherein the first pair of elongate tapes are attached at the first end of each flexible slat, the second pair of elongate tapes are attached at the second end of each flexible slat, and the third elongate tape is attached to each flexible slat in a location between the first pair and the second pair of elongate tapes.

7. The roll-up covering of claim 1, wherein the third elongate tape has a different width than either of the first pair of elongate tapes and the second pair of elongate tapes.

8. The roll-up covering of claim 1, wherein the tape thickness of each of the first pair of elongate tapes, the second pair of elongate tapes, and the third elongate tape are between 1 to 30 mils, and the tape width of each of the first pair of elongate tapes, the second pair of elongate tapes, and third elongate tape is between about 5 mm and about 100 mm.

9. The roll-up covering of claim 1, wherein:

each flexible slat has an inner longitudinal region comprising the inner longitudinal edge and an outer longitudinal region comprising the outer longitudinal edge;

one or more of the first inner elongate tape, the second inner elongate tape, and third elongate tape are inner tapes attached to the inner longitudinal region of at least one flexible slat; and one or more of the first outer elongate tape, the second outer elongate tape, and third elongate tapes are outer tapes attached to the outer longitudinal region of the at least one flexible slat.

10. The roll-up covering of claim 1, wherein the plurality of flexible slats in the open position are "S" shaped with the inner longkitudinal edge and the outer longitudinal edge of each of the plurality of flexible slats being substantially vertical and parallel to the first pair, the second pair, and the third elongate tapes.

11. The roll-up covering of claim 1, further comprising:

a plurality of elongate stiffeners, each elongate stiffener having a stiffener length, a stiffener width perpendicular to the stiffener length, and a stiffener thickness perpendicular to the stiffener width, wherein the thickness of each elongate stiffener is less than its width; and at least a respective one of the plurality of elongate stiffeners is attached to each of the flexible slats at or proximate to that slat's inner or outer longitudinal edge, and is positioned with its length extending in the same direction as the inner or the outer longitudinal edges of that slat.

12. The roll-up covering of claim 11, wherein each of the elongate stiffeners is separately formed from each of the slats and fixedly and directly attached to a respective one of the slats.

13. The roll-up covering of claim 11, wherein:

the at least one of the plurality of elongate stiffeners has an inward face and an outward face that are defined by surfaces defined by the length and width of the at least one of the plurality elongate stiffeners;

one of the inward face or the outward face of the at least one of the plurality of elongate stiffeners is attached to one of the upper or the lower face of at least one of the plurality of flexible slats.

14. The roll-up covering of claim 13, wherein one of the inward or outward faces of the at least one of the plurality of elongate stiffeners is convexly curved, and the other one of the inward or outward faces of the at least one of the plurality of elongate stiffeners is concavely curved.

15. The roll-up covering of claim 1, further comprising:

wherein the third elongate tape comprises a third pair of elongate tapes, wherein the third pair of elongate tapes comprises a third inner elongate tape and a third outer elongate tape wherein each of the third pair of elongate tapes are attached to each of the plurality of flexible slats in a location between each of the first and second ends of the plurality of flexible slats.

16. The roll-up covering of claim 15, wherein the first and second inner elongate tapes are attached to the inner longitudinal edge of each of the plurality of flexible slats and the first and second outer elongate tapes are attached to the outer longitudinal edge of each of the plurality of flexible slats, and with the expandable panel in a fully extended position, the first and second inner elongate tapes are laterally moveable relative to the first and second outer elongate tapes and the plurality of flexible vanes are angularly adjustable in response to the first and second inner elongate tapes being laterally moved relative to the first and second outer elongate tapes.

17. The roll-up covering of claim 1, wherein each of the plurality of separately formed flexible slats are fixedly attached to the first, second, and third elongate tapes.

18. A roll-up covering for an architectural structure, said roll-up covering comprising:

a first inner elongate tape and a second inner elongate tape, each of the first and second inner elongate tapes being opaque and having a first end, a second end, an inner tape length that extends from the first end to the second end, an inner tape width that extends perpendicular to the inner tape length, and an inner tape thickness perpendicular to and less than the inner tape width;

a first outer elongate tape and a second outer elongate tape, each of the first and second outer elongate tapes being opaque and having a first end, a second end, an outer tape length that extends from the first end to the second end, an outer tape width that extends perpendicular to the outer tape length, and an outer tape thickness perpendicular to and less than the outer tape width;

a third elongate tape, the third elongate tape having a first end, a second end, a third tape length that extends from the first end to the second end of the third elongate tape, a third tape width that extends perpendicular to the third tape length of the third elongate tape, and a third tape thickness perpendicular to and less than the third tape width of the third elongate tape; and a plurality of flexible slats separately formed from the inner elongate tapes, the outer elongate tapes, and the third elongate tape, each of the flexible slats having a first end and a second end, an inner longitudinal edge and an outer longitudinal edge, a slat length extending from the first end to the second end, and a slat width that extends from the inner longitudinal edge to the outer longitudinal edge, and an upper face and a lower face defined by the length and width of the respective flexible slat, wherein:

the first end of the inner tapes are attached to the roller at a first longitudinal location along a length of the roller and the first end of the outer elongate tapes are attached to the roller at a second longitudinal location along the length of the roller;

the greater of the sum total of the tape width of the first inner elongate tape, the second inner elongate tape and the third elongate tape or the sum total of the tape width of the first outer elongate tape, the second outer elongate tape and the third elongate tape is less than half of the slat length of any one of the plurality of flexible slats;

the plurality of flexible slats and the inner, the outer, and the third elongate tapes form an expandable panel where each of the plurality of separately formed flexible slats are attached to and vertically spaced apart along the tape length of each of the inner and outer elongate tapes and extend from the inner elongate tapes to the outer elongate tapes, and each of the flexible slats extend horizontally with its slat length extending in the same direction as the tape width of each of the inner and outer elongate tapes, the expandable panel moveable in a fully extended position between a closed configuration and an open configuration, wherein in the fully extended position at least one of the inner tape length of the inner elongate tapes or the outer tape length of the outer elongate tapes are fully unwound from the rotatable roller, wherein in the open configuration the inner elongate tapes are laterally separated from the outer elongate tapes and a middle portion of each of the flexible slats is not substantially parallel with the inner and outer elongate tapes, and whefrein in the closed configuration the inner elongate tapes are more adjacent the outer elongate tapes and each of the flexible slats is substantially parallel with the inner and outer elongate tapes;

with the expandable panel in the fully extended position, the inner elongatee tapes are laterally moveable relative to the outer elongate tapes and the plurality of flexible vanes are angularly adjustable in response to the inner tapes being laterally moved relative to the outer elongate tapes;

the first inner elongate tape and the first outer elongate tapes are both positioned at or proximate to each respective slat's first end, the second inner elongate tape and the second outer elongate tape are both positioned at or proximate to each repective slat's second end, and the third elongate tape is positioned between at least one of the first and second inner elongate tapes or the first and second outer elongate tapes; and the upper face of each of the plurality of separately formed, horizontally extending, flexible slats are adhesively attached to the first inner and second inner elongate tape and the lower face of each of the plurality of separately formed, horizontally extending, flexible slats are adhesively attached to the first outer and the second outer elongate tape to bias the plurality of flexible slats into the closed position.

19. The roll-up covering of claim 18, wherein each flexible slat has a central region along its slat length located in between the first and second end of each flexible slat, and the third elongate tape is located in the central region.

20. The roll-up covering of claim 18, wherein the first end of each slat does not extend past the first inner or first outer elongate tape, and the second end of each slat does not extend past the second inner or second outer elongate tape.

21. The roll-up covering of claim 18, wherein the plurality of flexible slats are configurable into the open configuration in which each flexible slat has a curved configuration with a middle portion of each flexible slat extending more horizontal than the first, second, and third elongate tapes.

22. The roll-up covering of claim 18, wherein:

each flexible slat has an inner longitudinal region comprising the inner longitudinal edge, and an outer longitudinal region comprising the outer longitudinal edge;

the first and second inner elongate tapes support the inner longitudinal regions of each of the plurality of flexible slats;

the first and second outer elongate tapes support the outer longitudinal regions of each of the plurality of flexible slats; and the third elongate tape supports at least one of the inner longitudinal regions or outer longitudinal regions of each of the plurality of flexible slats.

23. The roll-up covering of claim 18, wherein the first inner elongate tape and the first outer elongate tape are attached at the first end of each flexible slat, the second inner elongate tape and the second outer elongate tape are attached at the second end of each flexible slat, and the third elongate tape is attached to each flexible slat in a location between the first and second elongate tapes.

24. The roll-up covering of claim 18, wherein the third elongate tape has a different width than either of the first and second elongate tapes.

25. The roll-up covering of claim 18, wherein the tape thickness of each of the first, second, and third elongate tapes is between 1 to 30 mils, and the tape width of each of the first, second, and third elongate tapes is between about 5 mm and about 100 mm.

26. The roll-up covering of claim 18, further comprising:

a plurality of elongate stiffeners, each elongate stiffener having a stiffener length, a stiffener width perpendicular to the stiffener length, and a stiffener thickness perpendicular to the stiffener width, wherein the thickness of each elongate stiffener is less than its width; and at least one of the plurality of elongate stiffeners is attached to each of the flexible slats at or proximate to that slat's inner or outer longitudinal edge, and is positioned with its length extending in the same direction as the inner or the outer longitudinal edges of that slat.

27. The roll-up covering of claim 26, wherein each of the elongate stiffeners is separately formed from each of the slats and fixedly and directly attached to a respective one of the slats.

28. The roll-up covering of claim 26, wherein:

the at least one of the plurality of elongate stiffeners has an inward face and an outward face that are defined by surfaces defined by the length and width of the at least one of the plurality elongate stiffeners; and one of the inward face or the outward face of the at least one of the plurality of elongate stiffeners is attached to one of the upper or the lower face of at least one of the plurality of flexible slats.

29. The roll-up covering of claim 28, wherein one of the upper or lower faces of the at least one of the plurality of elongate stiffeners is convexly curved, and the other one of the upper or lower faces of the at least one of the plurality of slats is concavely curved.

30. The roll-up covering of claim 18, wherein in the fully extended position the plurality of flexible slats are configurable between the open configuration and the closed configuration, wherein each flexible slat changes shape as it is configurable between the open configuration and the closed configuration where in the open configuration the slat width of each flexible slat has a curved shape with a middle portion of each flexible slat extending more horizontal than the inner and outer longitudinal edges of each flexible slat.

31. The roll-up covering of claim 18, wherein the plurality of flexible slats in the open configuration are "S" shaped with the inner longitudinal edge and the outer longitudinal edge of each of the plurality of flexible slats being substantially vertical and parallel to the first and second inner elongate tapes and the first and second outer elongate tapes.

32. The roll-up covering of claim 18, wherein each of the plurality of separately formed flexible slats are fixedly attached to each of the inner and outer elongate tapes.

33. A roll-up covering for an architectural structure, said roll-up covering comprising:

a first pair of elongate tapes comprising a first inner elongate tape and a first outer elongate tape, a second pair of elongate tapes comprising a second inner elongate tape and a second outer elongate tape, and a third elongate tape, each of the elongate tapes being opaque and having a first end, a second end, a tape length that extends from the first end to the second end, a tape width as little as about 5 mm to as large as about 100 mm that extends perpendicular to the tape length, and a tape thickness perpendicular to and less than the tape width; and a plurality of flexible slats separately formed from the first pair of elongate tapes, the second pair of elongate tapes, and the third elongate tape, each of the flexible slats having a first end and a second end, an inner longitudinal edge and an outer longitudinal edge, a slat length extending from the first end to the second end, and a slat width that extends from the inner longitudinal edge to the outer longitudinal edge, and an upper face and a lower face defined by the length and width of the respective flexible slat, wherein:

the plurality of separately formed flexible slats are operably connected to each of the first pair of elongate tapes, the second pair of elongate tapes, and the third elongate tapes;

each of the plurality of separately formed flexible slats are vertically spaced apart along the tape lengths of each of the first pair of elongate tapes, the second pair of elongate tapes, and the third elongate tape;

each of the flexible slats are supported by and extend horizontally in the same direction as the tape widths of each of the first pair of elongate tapes, the second pair of elongate tapes, and the third elongate tape, the plurality of flexible slats and the elongate tapes form an expandable panel moveable in a fully extended position between an open configuration and a closed configuration in which the plurality of flexible slats are substantially planar and parallel to the elongate tapes;

the first elongate tapes are positioned at or proximate to each respective slat's first end, the second elongate tapes are positioned at or proximate to each respective slat's second end, and the third elongate tape has a different width than either of the first or second elongate tapes and is positioned between the first and second elongate tapes; and the upper face of each of the plurality of separately formed, horizontally extending, flexible slats are adhesively attached to one of the first inner elongate tape or the first outer elongate tape and the lower face of each of the plurality of separately formed, horizontally extending, flexible slats are adhesively attached to the respective second inner elongate tape or the second outer elongate tape to bias the plurality of flexible slats into the closed position.

34. The roll-up covering of claim 33, wherein each flexible slat has a central region along its slat length located in between the first and second end of each flexible slat, and the third elongate tape is positioned in the central region.

35. The roll-up covering of claim 34, wherein the third elongate tape is positioned and spaced along the slat length of each flexible slat so the distance between the first pair of elongate tapes and the third elongate tape is the same as the distance between the second pair of elongate tapes and the third elongate tape.

36. The roll-up covering of claim 33, wherein the first end of each of the plurality of flexible slats does not extend past the first pair of elongate tapes or the second pair of elongate tapes, and the second end of each of the plurality of flexible slats does not extend past the other of the first pair of elongate tapes or the second pair of elongate tape.

37. The roll-up covering of claim 33, wherein the expandable panel is in the open configuration each of the plurality of flexible slats is a curved shape with a middle portion of each of the plurality of flexible slats extending horizontal and transverse to the first pair of elongate tapes, the second pair of elongate tapes, and third elongate tape.

38. The roll-up covering of claim 33, wherein:

each flexible slat has an inner longitudinal region comprising the inner longitudinal edge and an outer longitudinal region comprising the outer longitudinal edge; the first and second pair of elongate tapes support the inner and outer longitudinal regions of each of the plurality of flexible slats; and the third elongate tape supports at least one of the inner longitudinal or outer longitudinal regions.

39. The roll-up covering of claim 32, wherein:

the first pair of elongate tapes are attached at the first end of each flexible slat;

the second pair of elongate tapes are attached at the second end of each flexible slat; and the third elongate tape is attached to each flexible slat in between the first and second pair elongate tapes.

40. The roll-up covering of claim 32, further comprising:

a plurality of elongate stiffeners, each elongate stiffener having a stiffener length, a stiffener width perpendicular to the stiffener length, and a stiffener thickness perpendicular to the stiffener width, wherein the thickness of each elongate stiffener is less than its width; and at least a respective one of the plurality of elongate stiffeners is attached to each of the flexible slats at or proximate to that slat's inner or outer longitudinal edge, and is positioned with its length extending in the same direction as the inner or the outer longitudinal edges of that slat.

41. The roll-up covering of claim 40, wherein each of the elongate stiffeners is separately formed from each of the slats and fixedly and directly attached to a respective one of the slats.

42. The roll-up covering of claim 40, wherein:

the at least one of the plurality of elongate stiffeners has an inward face and an outward face that are defined by surfaces defined by the length and width of the at least one of the plurality elongate stiffeners; and one of the inward face or the outward face of the at least one of the plurality of elongate stiffeners is attached to one of the upper or the lower face of at least one of the plurality of flexible slats.

43. The roll-up covering of claim 42, wherein one of the upper or lower faces of the at least one of the plurality of elongate stiffeners is convexly curved, and the other one of the upper or lower faces of the at least one of the plurality of slats is concavely curved.

44. The roll-up covering of claim 33, wherein the third elongate tape comprises a third pair of elongate tapes, wherein the third pair of elongate tapes is attached to each of the plurality of flexible slats at a location in between each of the first and second ends of the plurality of flexible slats.

45. The roll-up covering of claim 33, wherein the first and second inner elongate tapes are attached to the inner longitudinal edge of each of the plurality of flexible slats and the first and second outer elongate tapes are attached to the outer longitudinal edge of each of the plurality of flexible slats, and wherein the expandable panel is moveable to a fully extended position where at least one of the inner tape length of the first and second inner elongate tapes or the outer tape length of the first and second outer elongate tapes are fully unwound from a rotatable roller and the expandable panel is moveable in the fully extended position between the closed configuration and the open configuration, wherein with the expandable panel in a fully extended position, the first and second inner elongate tapes are laterally moveable relative to the first and second outer elongate tapes and the plurality of flexible vanes are angularly adjustable in response to the first and second inner elongate tapes being laterally moved relative to the first and second outer elongate tapes.

46. The roll-up covering of claim 45, wherein in the fully extended position the plurality of flexible slats are configurable between the open configuration and the closed configuration, wherein each flexible slat changes shape as it is configurable between the open configuration and the closed configuration where in the open configuration the slat width of each flexible slat has a curved shape with a middle portion of each flexible slat extending more horizontal than the inner and outer longitudinal edges of each flexible slat.

47. The roll-up covering of claim 45, wherein the plurality of flexible slats in the open configuration are "S" shaped with the inner longitudinal edge and the outer longitudinal edge of each of the plurality of flexible slats being substantially vertical and parallel to the first and second inner elongate tapes and the first and second outer elongate tapes.

48. The roll-up covering of claim 33, wherein the plurality of separately formed flexible slats are fixedly attached to each of the first pair of elongate tapes, the second pair of elongate tapes, and the third elongate tape.

* * * * *